(12) United States Patent
Mach et al.

(10) Patent No.: US 11,709,324 B2
(45) Date of Patent: Jul. 25, 2023

(54) SELF-ALIGNING ROTATING OPTICAL CONNECTOR

(71) Applicant: Canon U.S.A., Inc., Melville, NY (US)

(72) Inventors: Anderson Thi Mach, Cambridge, MA (US); Alexander Altshuler, Cambridge, MA (US); Xuri Yan, Newton, MA (US)

(73) Assignee: Canon U.S.A., Inc., Melville, NY (US)

(*) Notice: Subject to any disclaimer, the term of this patent is extended or adjusted under 35 U.S.C. 154(b) by 92 days.

(21) Appl. No.: 17/366,907

(22) Filed: Jul. 2, 2021

(65) Prior Publication Data

US 2022/0043219 A1 Feb. 10, 2022

Related U.S. Application Data

(60) Provisional application No. 63/062,341, filed on Aug. 6, 2020.

(51) Int. Cl.
*G02B 6/38* (2006.01)
*G02B 6/42* (2006.01)

(52) U.S. Cl.
CPC .......... *G02B 6/3874* (2013.01); *G02B 6/389* (2013.01); *G02B 6/3825* (2013.01); *G02B 6/3871* (2013.01); *G02B 6/4292* (2013.01)

(58) Field of Classification Search
CPC .... G02B 6/3874; G02B 6/389; G02B 6/4292; G02B 6/3825
See application file for complete search history.

(56) References Cited

U.S. PATENT DOCUMENTS

| | | | |
|---|---|---|---|
| 8,280,205 B2 | 10/2012 | Erdman et al. | |
| 8,753,022 B2 | 6/2014 | Shroeder et al. | |
| 9,360,630 B2* | 6/2016 | Jenner | G02B 6/3604 |
| 9,678,286 B2 | 6/2017 | Valencia | |
| 9,869,828 B2 | 1/2018 | Altshuler | |
| 10,371,900 B2 | 6/2019 | Kluwe et al. | |
| 10,422,965 B2 | 9/2019 | Cheng | |
| 10,564,363 B1 | 2/2020 | Corl et al. | |
| 10,601,173 B2 | 3/2020 | Altshuler | |
| 10,825,152 B2* | 11/2020 | Wu | A61B 1/00009 |
| 10,845,549 B2 | 11/2020 | Mach et al. | |
| 10,895,698 B2 | 1/2021 | Nhep et al. | |
| 11,259,694 B2* | 3/2022 | Mach | A61B 1/00165 |
| 11,454,764 B2* | 9/2022 | Morita | G02B 6/4226 |
| 2017/0176245 A1* | 6/2017 | Kocak | G02B 6/3895 |
| 2019/0243074 A1* | 8/2019 | Mach | G02B 6/3878 |
| 2020/0313346 A1 | 10/2020 | Hwang et al. | |

* cited by examiner

*Primary Examiner* — Ryan A Lepisto
*Assistant Examiner* — Erin D Chiem
(74) *Attorney, Agent, or Firm* — Canon U.S.A., Inc. IP Division

(57) ABSTRACT

An optical connection includes a plurality of ferrules, an optical contact to allow transfer of light, a mechanical contact to allow torque transfer from the optical connection, and a rotational self-alignment structure to allow optical fibers of different optical connectors to self-rotate into rotational self-alignment upon action of connecting, wherein the ferrules are aligned and engage the torque transfer. The rotational self-alignment structure can be a tooth configuration, a helical thread configuration, a ferrule guide configuration, a spring sleeve configuration, derivatives thereof and combinations therefrom.

17 Claims, 37 Drawing Sheets

SELF-ALIGNING ROTATING OPTICAL CONNECTOR

CROSS REFERENCE TO RELATED APPLICATIONS

The present application claims the benefit of priority from U.S. Provisional Application No. 63/062,341 filed Aug. 6, 2020, which is hereby incorporated by reference herein in its entirety.

BACKGROUND

Field of the Disclosure

The present disclosure generally relates to optical connectors and, more particularly, to a self-aligning rotating optical connector.

Description of the Related Art

Optical connections generally include optical connectors that interconnect optical fibers together to provide optical and electrical communication between cabling, equipment, or the like. Optical connectors can include interconnecting ferrules formed as mating components, for example female plugs or male connectors with ferrules having ends of optical fibers held therein. In a connection between two optical fibers that abut each other, the ferrules of the connectors for each of the ends are coupled together to hold the optical fibers in alignment and in close contact. Optical connectors generally have keyed ferrules to contact mating ferrules tightly to reduce the air gap between the ferrules, thereby reducing loss and back reflection of the light. Optical connectors can be spring-loaded so the fiber faces are pressed together when the connectors are mated. A specific orientation of the male and female plug is normally employed in order to have proper engagement upon connection.

A medical device hand piece, such as a spectrally encoded endoscopy (SEE) hand piece for example, can have a rotating optical connection between a rotating motor shaft of a medical instrument like an endoscope and a handle like a multiuse (MU) handle. Users need a quick connection of the endoscope to the MU handle, however the optical connection on the motor shaft can be in any orientation.

It would be beneficial to overcome these concerns and provide an optical connection that allows the optical ferrules to self-rotate into rotational self-alignment upon the action of connecting.

SUMMARY

According to an aspect of the present disclosure, an optical connection includes a plurality of ferrules, an optical contact to allow transfer of light, a mechanical contact to allow torque transfer from the optical connection, and a rotational self-alignment structure to allow optical fibers of different optical connectors to self-rotate into rotational self-alignment upon action of connecting, wherein the ferrules are rotationally self-aligned and engage the torque transfer. The rotational self-alignment structure can be a tooth configuration, a helical thread configuration, a ferrule guide configuration, a spring sleeve configuration, derivatives thereof and combinations therefrom.

According to another aspect of the present disclosure, the rotational self-alignment structure can be a tooth configuration including angled and pointed teeth configured to interconnect with another complementary optical connector by rotating the two connectors together. The optical connection can include a friction sleeve configuration comprising a friction sleeve that has a compression fit on and axially aligns and interconnects opposed ferrules. The optical connection can include a spring, wherein drive torque is generated using friction from the friction sleeve and the axial forces of the spring. The plurality of ferrules can include optical faces and the at least one spring allows for constant contact of the optical faces during connection.

According to another aspect of the present disclosure, the optical connection can have a housing that extends between two ends, and a flange connected at one end of the housing and a connection ferrule connected at the other end of the housing. The optical connection can have a multi-piece rod or segmented shaft connected to the flange and extending through the housing between the flange and the connection ferrule. The optical connection can have a spring and an internal sheath, wherein the spring is contained in the internal sheath of the housing near the flange. The housing of the optical connection can axially align and interconnects two internally opposed optical ferrules that are cooperatively held together with the rotational self-alignment structure. The rotational self-alignment structure can align the ferrules axially to allow light transfer between fibers with low light loss.

According to another aspect of the present disclosure, the optical connection can include a rotating optical connector. The optical connection can include at least one optical fiber. The optical connection can be configured for rotational self-alignment and torque transfer. The plurality of ferrules can be optical ferrules. The plurality of ferrules can include a mechanical connection ferrule. The plurality of ferrules can be configured to self-rotate into a rotational self-alignment that allows for contact of optical faces and engagement of the torque transfer. The plurality of ferrules can include optical fibers that rotate together simultaneously with respect to one another while motorized. The plurality of ferrules can be optical ferrules that are passively connected in an axial direction. The plurality of ferrules can be optical ferrules that are connected and disconnected by push/pull action.

Further features of the present disclosure will become apparent from the following description of exemplary embodiments with reference to the attached drawings.

DESCRIPTION OF THE EMBODIMENTS

Figure 1:
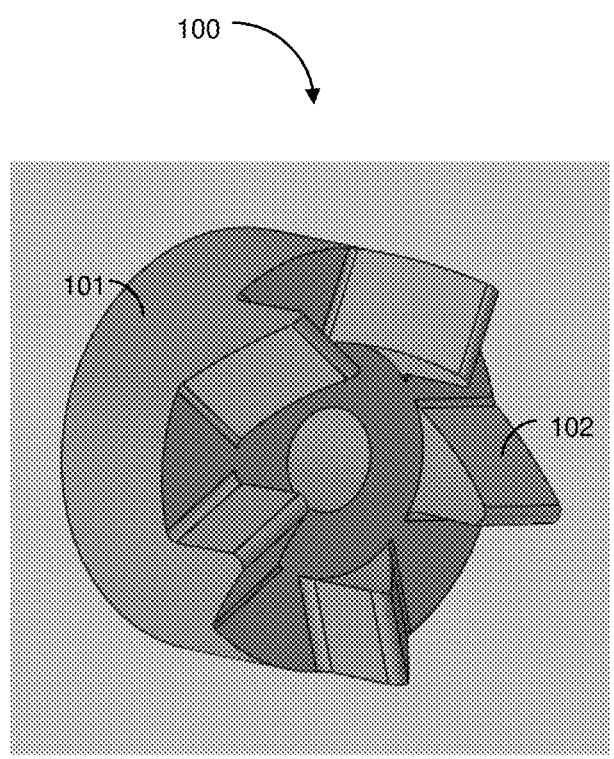
FIG. 1 is a tooth configurational element according to one or more embodiments.

Various exemplary embodiments, features, and aspects of the disclosure will be described below with reference to the drawings.

In the following embodiments, optical connector or connection configurations are described to provide optical or electrical communication that may have different characteristics, advantages, disadvantages, performance parameters, or the like. The present disclosure is not limited to any particular configuration. Optical communications, for example, are described between medical devices at one end of a connector and an external device, motor, or component at another end of the connector, and can be made between other elements.

Optical connection configurations generally include optical connectors that interconnect optical fibers together to provide optical or electrical communication between the fibers. Optical connectors are described that can be applied to various fields including, for example, minimally invasive medical devices that implement intravascular imaging modalities including, for example, optical coherence tomography (OCT), spectrally encoded endoscopy (SEE), intravascular ultrasound (IVUS), combinations or hybrids thereof, or the like.

An optical connector according to one or more aspects of the present disclosure is configured to hold or support one or more optical fibers and can include a rotational self-alignment or self-aligning structure to facilitate the rotational self-alignment of optical fibers of the optical connector with optical fibers of another connector, and is described herein as an rotational self-alignment or self-aligning structure, component, mechanism, feature, or element, and can be referred to as other variations.

In particular, the rotational self-alignment structure allows optical fibers of different optical connectors to self-rotate into rotational self-alignment upon the action of connecting conveniently to properly align with each other through interconnection and rotation of one connector with another connector.

An optical connector with the rotational self-alignment structure can include one or more ferrules, optical contacts between the ferrules to allow transfer of light, sleeves, springs, mechanical contacts to allow the transfer of torque from a motor to an instrument, mechanical contacts of a connector body housing, derivatives thereof and combinations therefor, to allow for quick connect/disconnect to maintain engagement of connections.

In the following embodiments, one or more aspects or features of the present disclosure are directed to optical connections, rotational self-alignment and torque transfers, and mechanical housing connections.

An optical connection can include two or more connectors that interconnect together, such as a male plug, a female receptacle, or the like. The male plug can have an exposed optical ferrule. The female receptacle can include an optical ferrule embedded within a rotational self-alignment sleeve. The sleeve can rotationally self-align the ferrules axially to allow light transfer between fibers with low light loss. At least one side or both can have a spring to allow for constant contact of the optical faces during connection.

The optical connection arrangements described herein are configured for rotational self-alignment and torque transfer. Upon connection, the ferrule bodies are configured to self-rotate into a rotational self-alignment that allows for contact of the optical faces and engagement of the torque transfer. The optical contacts can be engaged rotationally and can rotate together simultaneously with respect to one another while the motor is in action. The optical ferrules can be connected passively in an axial direction and can be connected and disconnected by the action of push/pull. Bearings can be incorporated to reduce friction during rotation.

A mechanical housing connection can be configured where the optical contacts are in a housing which hold the components in place. The housing of a medical device like an endoscope housing can be connected to a multi-use (MU) handle. The mechanical connection of these bodies maintains the axial connections of the optical and rotational sub-connections. The mechanical housing connection can be configured as a variety of connectors including, for example, push/pull quick connect, screw-on, snap-in, bayonet, or the like.

The optical connectors can be configured to hold or pass through one or more optical fibers or similar waveguides, where the optical fibers can be configured circular, rectangular, or the like, and can include polymer, glass, silicon, air, or combinations thereof. The optical fibers can be single-mode or multimode optical fibers, photonic crystal fibers, photonic bandgap fibers, polarization maintaining fibers, or the like, and may include one or more fibers, a plurality of fibers, a fiber bundle, or the like. Single-mode optical fibers can support a single optical mode, and multimode optical fibers can support multiple optical modes.

The optical fibers can be configured as fiber optic cables that can include a few optical fiber threads or several hundred optical fiber threads, each of which may transmit data modulated into light waves. The optical fibers can include a transparent core having a higher index of refraction surrounded by a transparent cladding material with a lower index of refraction. Light may be kept in the core by a phenomenon of total internal reflection, and some light may travel in cladding as an evanescent wave, which may include all the wavelengths of the light that are outputted by a light source.

An optical connection according to one or more aspects of the present disclosure can have a rotational self-alignment structure and a rotating optical connector including one or more types of rotational self-alignment engagement upon connection. These rotational self-alignment engagement types can include, for example, an optical contact between the ferrules to allow transfer of light, one or more ferrules, sleeves, and springs. Consider a configuration including two ferrules, one sleeve, and one or two springs. A mechanical contact can allow the transfer of torque from a motor to a scope. The mechanical contact of the connector body housings can facilitate or allow a quick connect and disconnect to maintain engagement of the above connections.

The optical connector can mechanically couple the end of an optical fiber cable to another optical fiber structure such as an adapter, another connector, a transceiver, or the like, to establish an optical connection between one or more pairs of optical fibers. The optical connector can be a mechanical coupling device that is configured to align opposed ends of optical fibers for optical communication. An optical fiber connecter can be configured to establish an optical connection of two or more ferrules or a multi-fiber ferrule.

Rotational self-alignment structures that provide rotational self-alignment engagement of the optical connection arrangements can be selected from tooth configurations, helical thread configurations, ferrule guide configurations, spring sleeve configurations, derivatives thereof and combinations therefrom, to facilitate interconnection of one connector with a cooperating rotational self-alignment structure of another connector. The ferrule guide can be at the entrance of a passage to guide the ferrule during insertion.

Optical connection arrangements are described below that have the rotational self-alignment structures to provide rotational self-alignment engagement and allow the optical ferrules to self-rotate into rotational self-alignment upon the action of connecting according to one or more aspects of the present disclosure.

Figure 2:
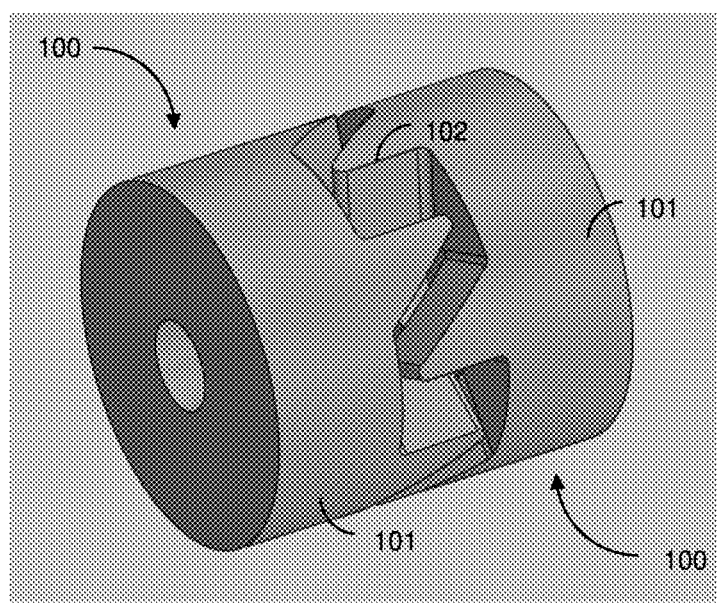
FIG. 2 illustrates two interconnecting tooth configurational elements according to one or more embodiments.

FIGS. 1 and 2 illustrate an exemplary rotational self-alignment structure 100 with a tooth configuration for an optical connector according to the present embodiment.

The rotational self-alignment structure 100 has a tooth configuration that can be used to self-rotate and interconnect components or ferrule bodies into a rotational self-alignment that allows for contact of the optical faces and engagement of torque transfer. The rotational self-alignment structure 100 has a base 101 and a plurality of teeth 102 where the teeth have a tooth shape with a flat side and a smooth angular or arch-shaped side so the optical contacts can be rotationally engaged and can rotate together simultaneously with respect to one another while a motor is in action. As shown in FIG. 2, two interconnecting rotational self-alignment structures 100 with tooth configurations can allow optical ferrules to be connected passively in an axial direction and be connected and disconnected by the action of push/pull. Bearings can be incorporated to reduce friction during rotation.

The base 101 of the rotational self-alignment structures 100 is shaped to allow interconnection of an optical connector with a cooperative structure on another connector. The rotational self-alignment structures 100 have teeth configurations in the form of angled and pointed teeth to operate or facilitate interconnection with a cooperating rotational self-alignment component of another connector. The angled and pointed teeth of the rotational self-alignment structures 100 are configured to interconnect with another complementary optical connector by rotating the two connectors together, whereby the angled and pointed teeth of one connector rotationally engage with the cooperating and complementary angled and pointed teeth of the other connector. The angled and pointed tooth rotational self-alignment structure allows optical fibers of different optical connectors to self-rotate into rotational self-alignment upon the action of connecting conveniently and properly align with each other through interconnection and rotation of one connector with the other connector.

The optical connectors interconnect together, and have connector components including, for example, a male plug, a female receptacle, or the like. The male plug can have an exposed optical ferrule. The female receptacle can include an optical ferrule embedded within a rotational self-alignment sleeve. The sleeve can rotationally self-align the ferrules axially to allow light transfer between fibers with low light loss. At least one side or both can have a spring to allow for constant contact of the optical faces during connection.

An optical fiber held or contained within the connectors and an optical contact is provided between the ferrule and the opposing ferrule to allow transfer of light. The mechanical contact of the flange and the housing allows the transfer of torque from a motor to an instrument, such as a medical device. The connector is configured to allow for quick connect/disconnect to maintain engagement of connections.

Upon connection, the ferrule bodies are configured to self-rotate into a rotational self-alignment that allows for contact of the optical faces and engagement of the torque transfer. The optical contacts can be engaged rotationally and can rotate together simultaneously with respect to one another while the motor is in action. The optical ferrules can be connected passively in an axial direction and can be connected and disconnected by the action of push/pull. Bearings can be incorporated to reduce friction during rotation.

Figure 3:
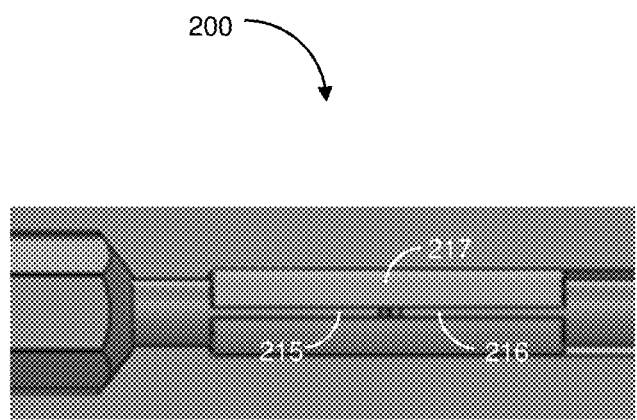
FIG. 3 is a friction sleeve alignment component that can be implemented in a rotational self-alignment connector according to one or more embodiments.
Figure 4:
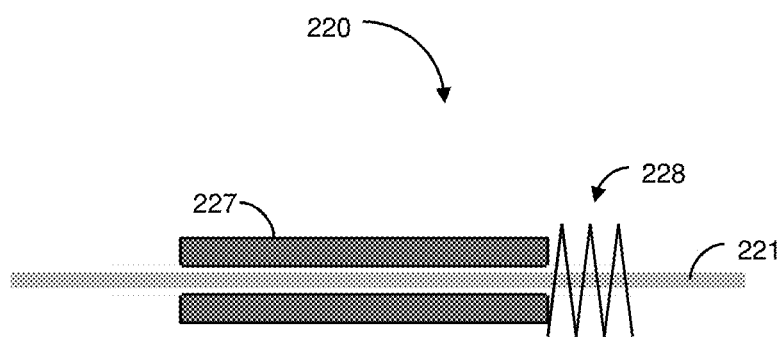
FIG. 4 is a friction sleeve alignment schematic that can be implemented in a rotational self-alignment connector according to one or more embodiments.

FIGS. 3 and 4 illustrate an exemplary axial-alignment structure 200 with a friction sleeve configuration that can be implemented in a rotational self-alignment optical connector according to the present embodiment.

In FIG. 3, a friction sleeve axial-alignment configuration 200 shows a friction sleeve axial-alignment component 217 configured to facilitate the axial-alignment of optical fibers of an optical ferrule 215 with optical fibers of an opposing optical ferrule 216. The friction sleeve axial-alignment component 217 has a compression fit on and axially aligns and interconnects the two internally opposed ferrules 215, 216 to allow the transfer of torque from a motor. The ferrules 215, 216 are axially aligned and connected together within the friction sleeve 217 and drive torque is generated using the friction from the friction sleeve 217.

FIG. 4 shows a friction sleeve axial-alignment schematic 220 with an optical fiber or waveguide 221 that is contained within or passes through a friction sleeve alignment component 227 that is biased by a spring 228. The friction sleeve axial-alignment component can facilitate the axial-alignment of optical fibers of an optical ferrule with optical fibers of an opposing optical ferrule. The friction sleeve axial-alignment component 227 has a compression fit on and axially aligns and interconnects internally opposed ferrules to allow the transfer of torque from a motor. The ferrules are axially aligned and connected together within the friction sleeve 227 and drive torque is generated using the friction from the friction sleeve 227.

The friction sleeve axial-alignment configuration 200 can be implemented in rotational self-alignment optical connection arrangements to facilitate interconnection of one connector with a cooperating alignment structure of another connector.

Figure 5:
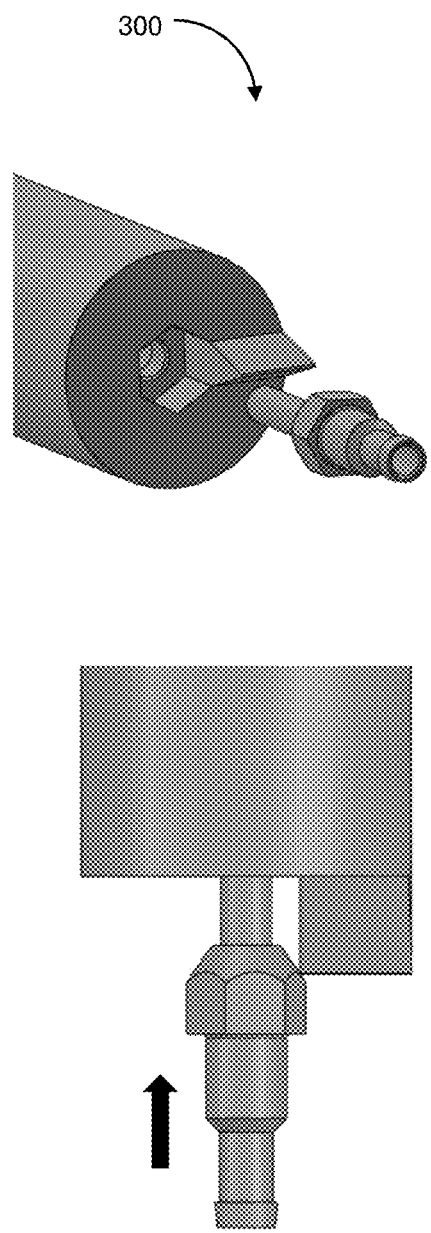
FIG. 5 illustrates a front perspective view and a top view of an optical ferrule and a rotational self-alignment component according to one or more embodiments.
Figure 6:
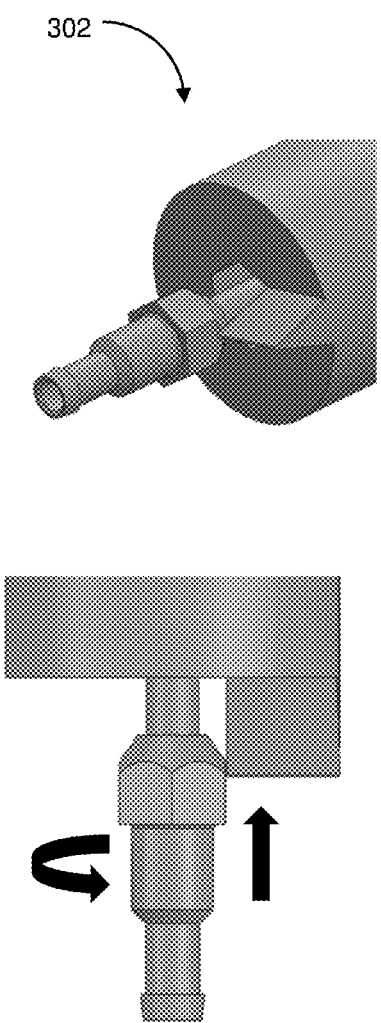
FIG. 6 illustrates a front perspective view and top view of an optical ferrule and a rotational self-alignment component according to one or more embodiments.
Figure 7:
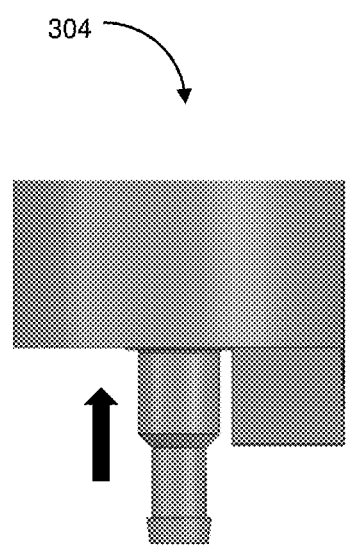
FIG. 7 is a top view of an optical ferrule and a rotational self-alignment component according to one or more embodiments.
Figure 8:
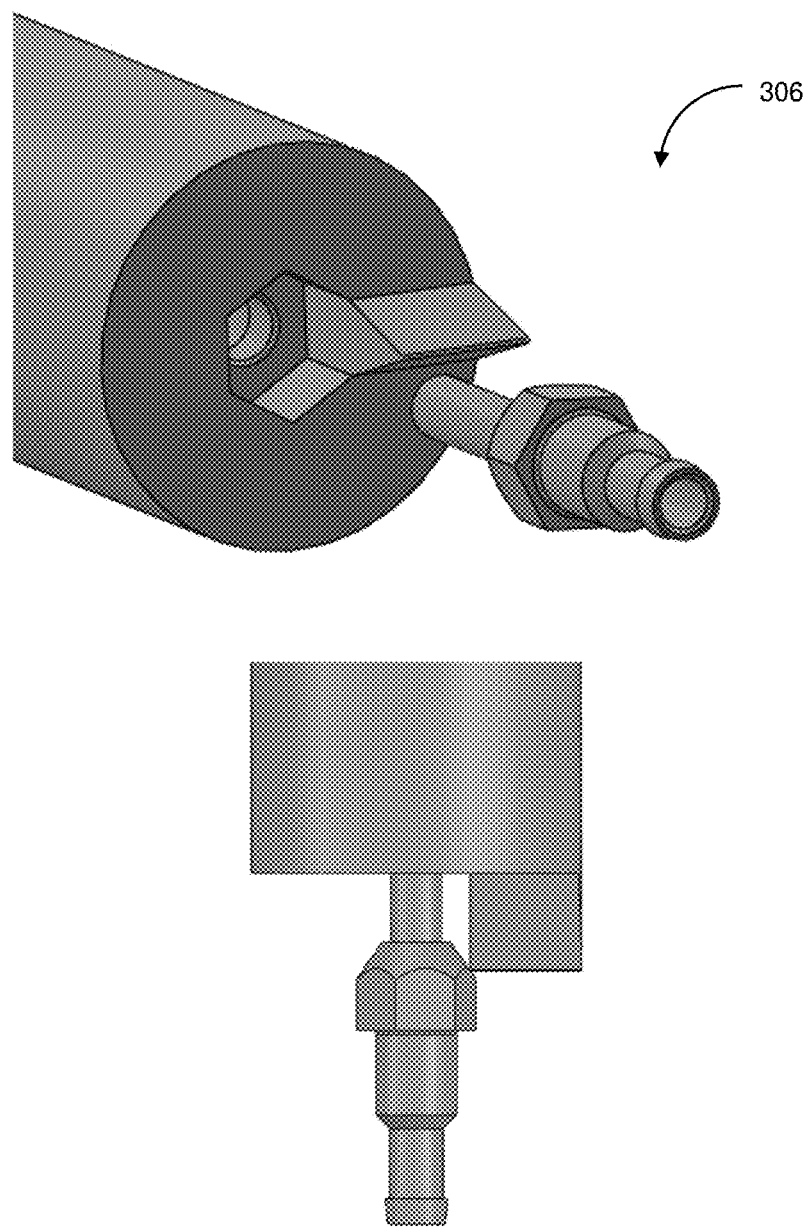
FIG. 8 illustrates a front perspective view and a top view of an optical ferrule and a rotational self-alignment component according to one or more embodiments.
Figure 9:
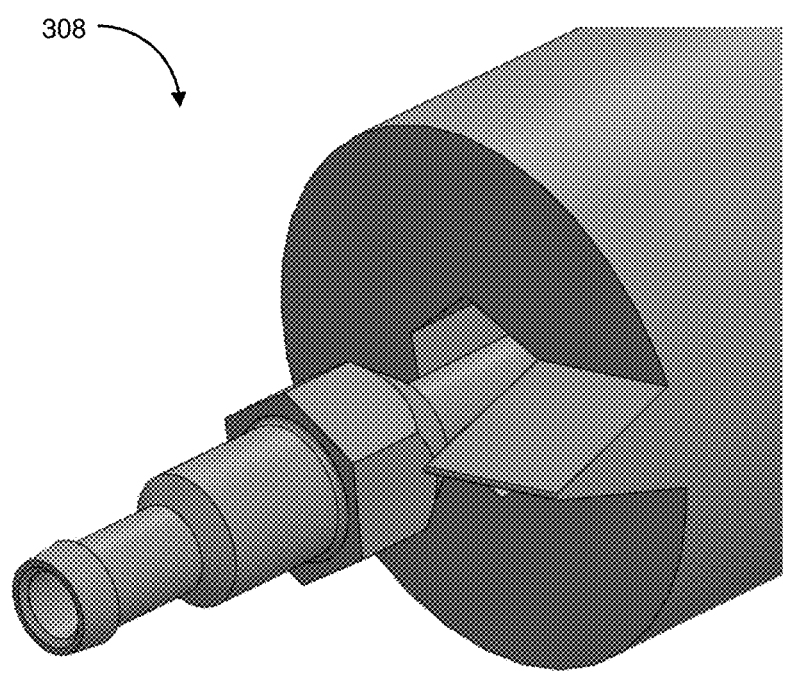
FIG. 9 illustrates a front perspective view of an optical ferrule and a rotational self-alignment component according to one or more embodiments.
Figure 10:
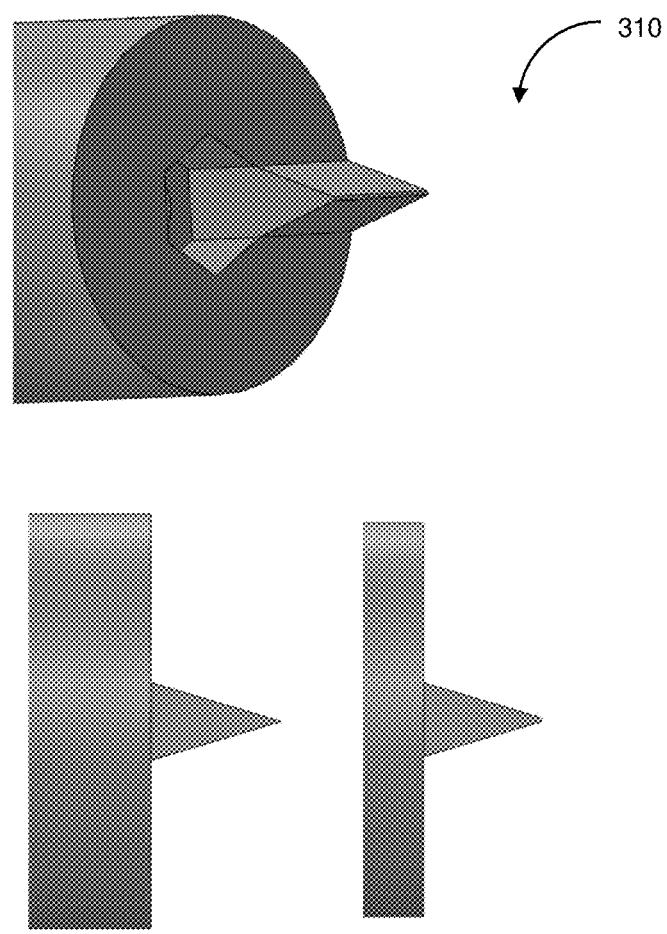
FIG. 10 illustrates a front perspective view and side views of an optical ferrule and a rotational self-alignment component according to one or more embodiments.
Figure 11:
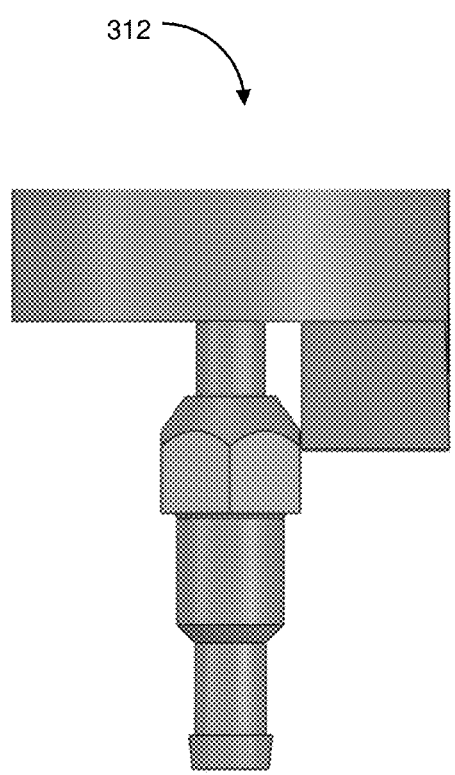
FIG. 11 is a top view of an optical ferrule and a rotational self-alignment component according to one or more embodiments.
Figure 12:
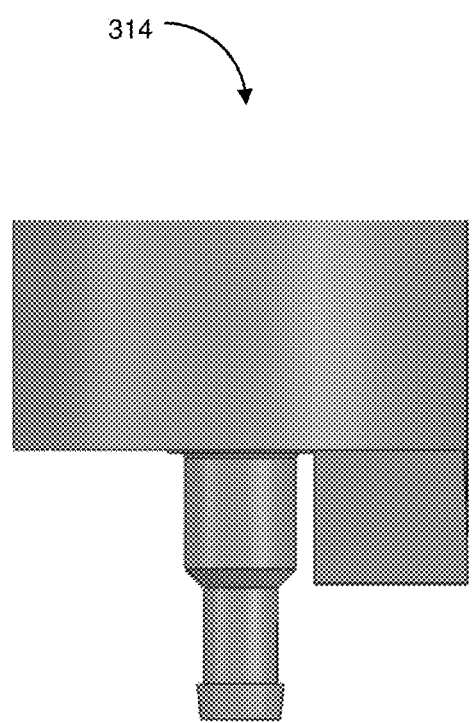
FIG. 12 is a top view of an optical ferrule and a rotational self-alignment component according to one or more embodiments.
Figure 13:
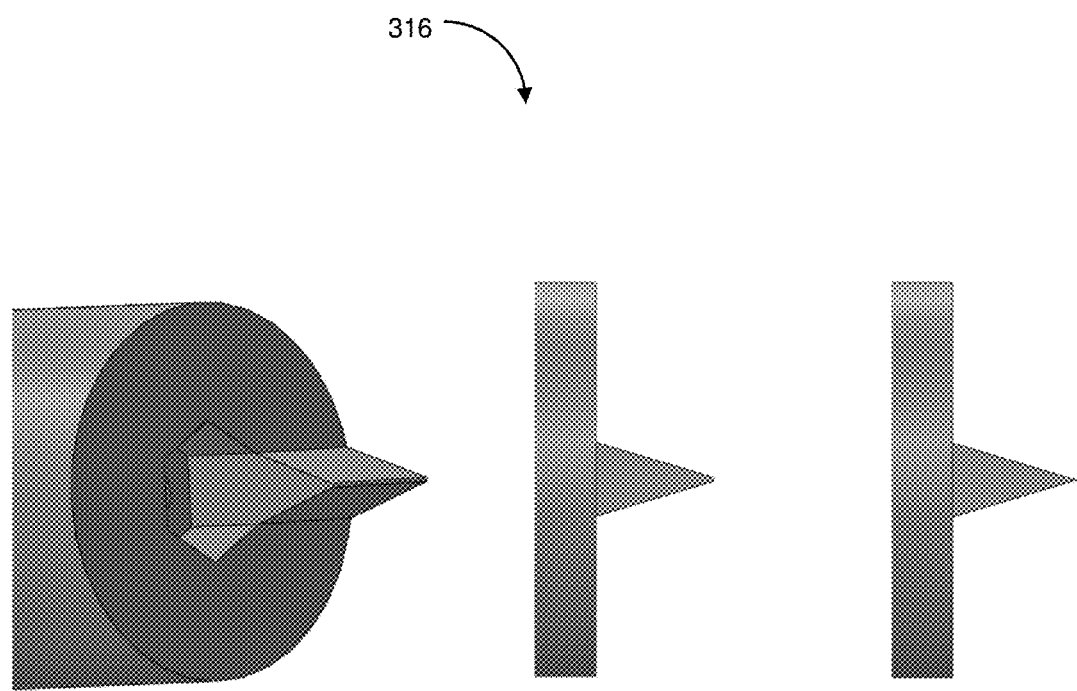
FIG. 13 illustrates a front perspective view and side views of a rotational self-alignment component according to one or more embodiments.
Figure 14:
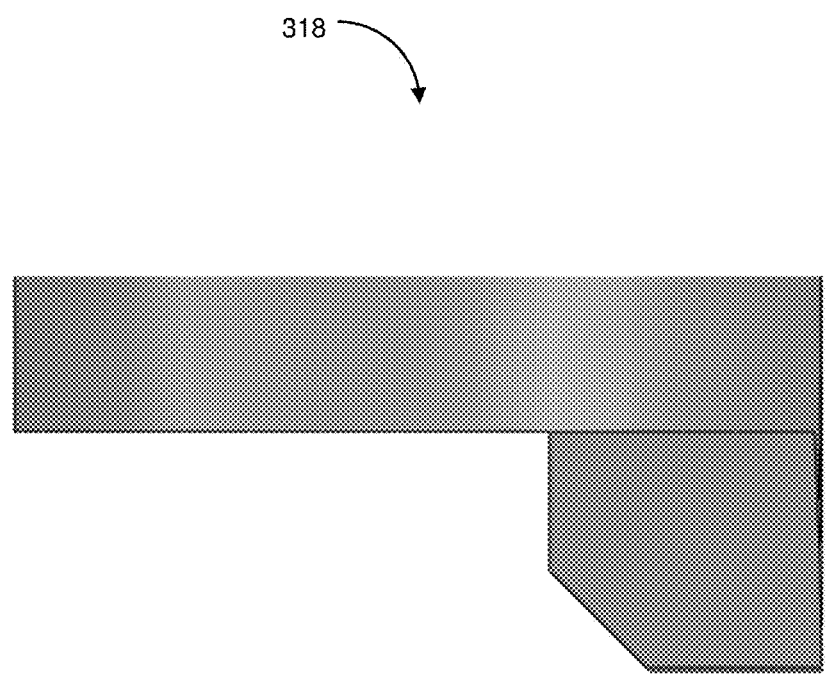
FIG. 14 is a top view of a rotational self-alignment component according to one or more embodiments.
Figure 15:
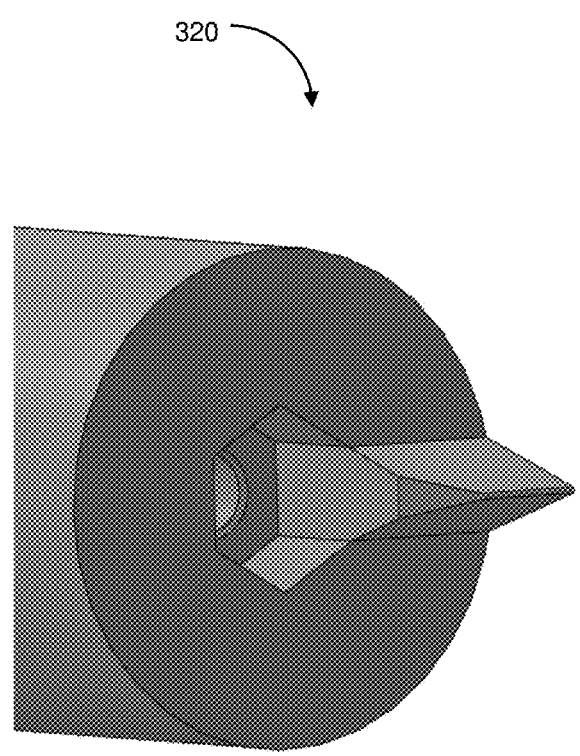
FIG. 15 is a front perspective view of a rotational self-alignment component according to one or more embodiments.

FIGS. 5-7 show front perspective and top views of optical ferrules and rotational self-alignment component configurations 300, 302, 304 according to one or more embodiments, where the rotational self-alignment components include an angled tooth configuration.

FIGS. 8, 9, 11 and 12 show various views of optical ferrule and rotational self-alignment component configurations 306, 308, 312, 314, according to one or more embodiments. FIGS. 10 and 13-15 show various views of rotational self-alignment component configurations 310, 316, 318, 320 according to one or more embodiments.

Figure 16:
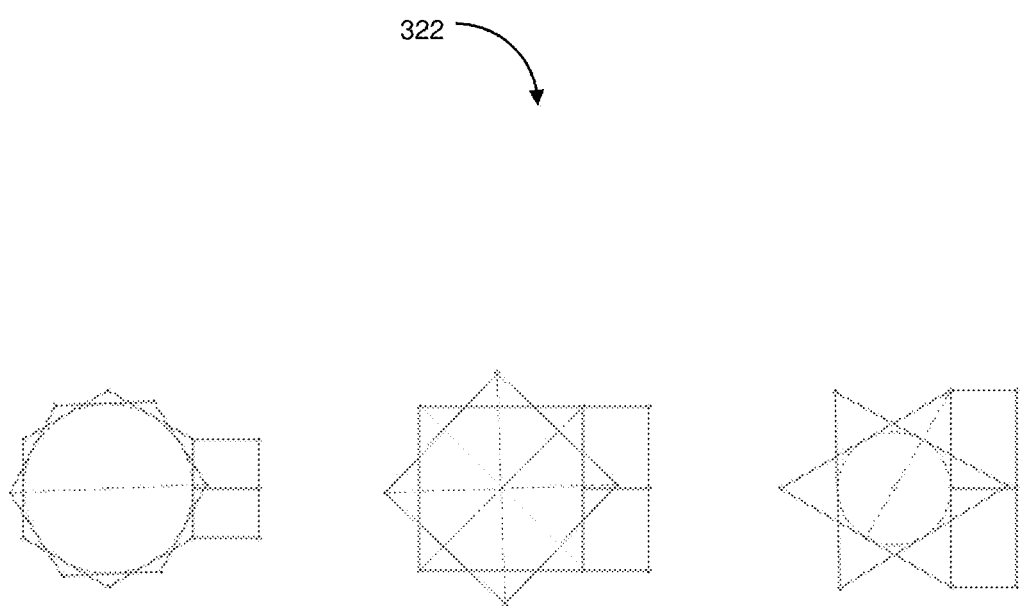
FIG. 16 are front schematics of rotational self-alignment components according to one or more embodiments.

In FIG. 16, front schematics 322 of rotational self-alignment components are shown according to one or more embodiments.

In these figures, an end of a housing near the ferrule is shaped to allow interconnection of an optical connector with a cooperative structure on another connector. In these cases, the housings are configured with a rotational self-alignment structure or component in the form of an angled and pointed tooth to facilitate interconnection with another connector. The angled and pointed tooth can operate as a rotational self-alignment structure to engage with a cooperating rotational self-alignment component of another connector. The angled and pointed tooth of the housing is configured to rotationally interconnect with another complementary optical connector by rotating the two connectors together, whereby the angled and pointed tooth rotational self-alignment connector of one connector rotationally engages with the cooperating and complementary rotational self-alignment component of the other connector. The angled and pointed tooth rotational self-alignment structure allows optical fibers of different optical connectors to conveniently and properly align with each other through interconnection and rotation of one connector with the other connector.

An optical fiber held or contained within the connectors and an optical contact is provided between the ferrule and the opposing ferrule to allow transfer of light. The mechanical contact of the flange and the housing allows the transfer of torque from a motor to an instrument, such as a medical device. The connector is configured to allow for quick connect/disconnect to maintain engagement of connections.

Upon connection, the ferrule bodies are configured to self-rotate into a rotational self-alignment that allows for contact of the optical faces and engagement of the torque transfer. The optical contacts can be rotationally engaged and can rotate together simultaneously with respect to one another while the motor is in action. The optical ferrules can be connected passively in an axial direction and can be connected and disconnected by the action of push/pull. Bearings can be incorporated to reduce friction during rotation.

Figure 17:
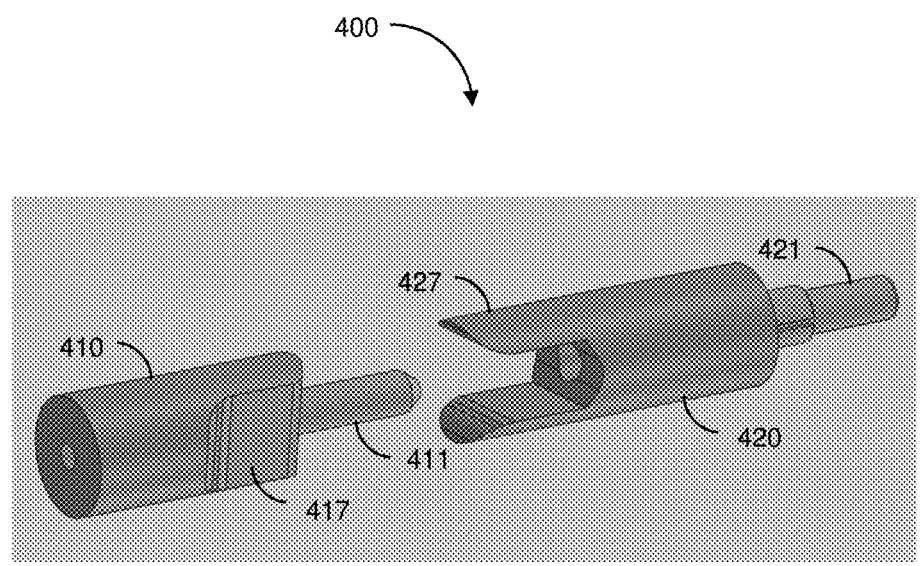
FIG. 17 is a side perspective view of an optical connector according to an embodiment.
Figure 18:
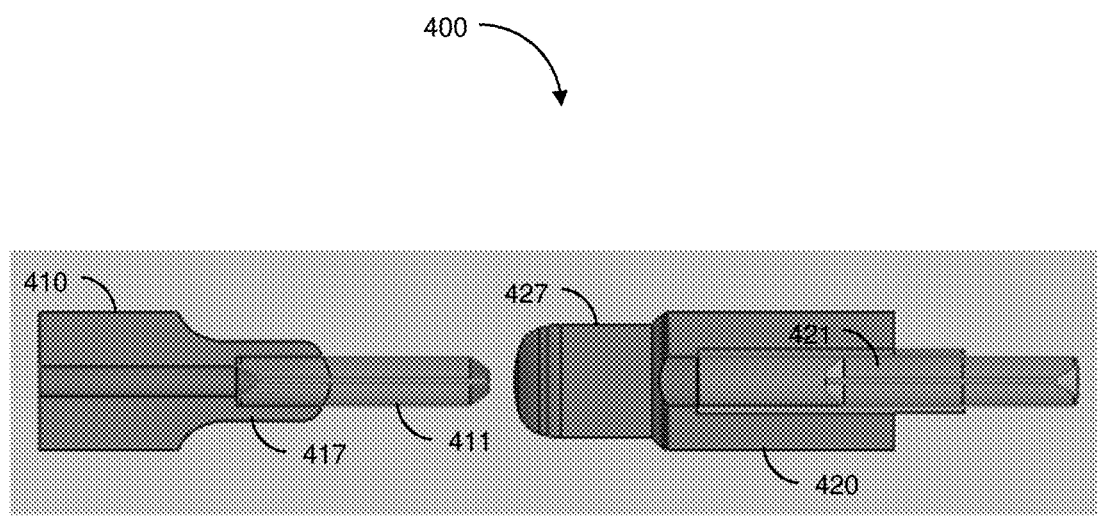
FIG. 18 is a cross-sectional side view of the optical connector according to an embodiment.
Figure 19:
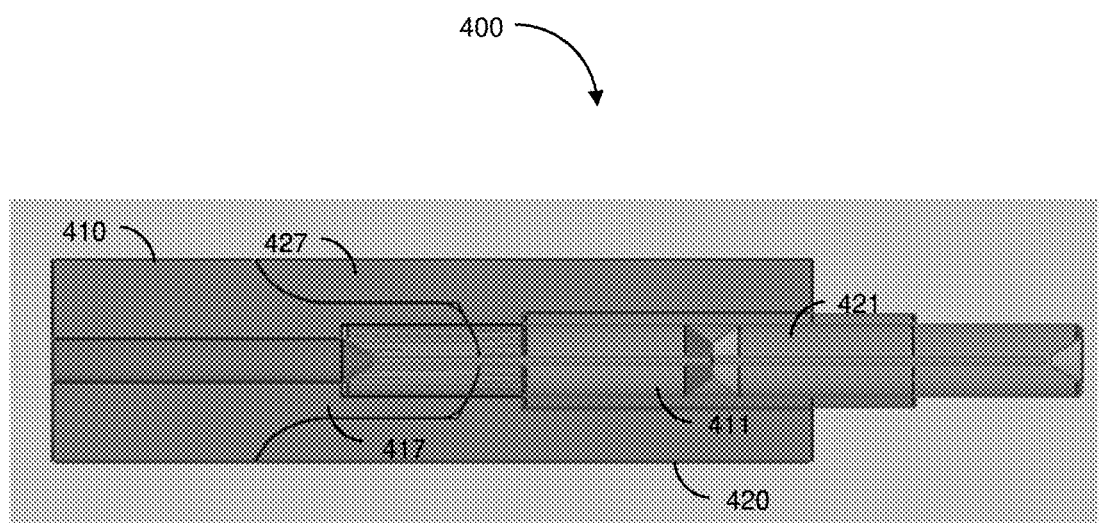
FIG. 19 is a cross-sectional side view of the optical connector according to an embodiment.

FIGS. 17-19 illustrate various views of an exemplary optical connector 400 with an alternate ferrule guide according to the present embodiment.

FIG. 17 is a side perspective view of the optical connector 400 where a male plug 410 is separated from and axially aligned with a female receptacle 420. The male plug 410 and female receptacle 420 interconnect together through use of interconnecting rotational self-alignment components 417 and 427. The male plug 410 has a ferrule 411 extending from one end of a cylindrical housing configuration where the rotational self-alignment component 417 is provided. The female receptacle 420 has a ferrule 421 internally recessed within the housing of the receptacle 420 and the rotational self-alignment component 427 extends from the other end of the receptacle 420. The rotational self-alignment components 417 and 427 are configured to facilitate rotational self-alignment of optical fibers of the male plug 410 with optical fibers of the female receptacle 420. The rotational self-alignment component 417 of the male plug 410 includes substantially flat parallel surfaces that are shaped by forming or otherwise shaving away or removing portions on opposing sides of the cylindrical housing of the male plug 410. The rotational self-alignment component 427 of the female receptacle 420 includes substantially flat parallel extensions shaped by forming or otherwise removing portions of the cylindrical housing of the female receptacle 420.

FIG. 18 is a cross-sectional side view of the connector 400 where the male plug 410 is axially and rotational self-aligned with and separated from the female receptacle 420. FIG. 19 is a cross-sectional side view of the connector 400 where the male plug 410 is interconnected with the female receptacle 420.

The rotational self-alignment components 417 and 427 are interconnected with each other by rotating the plug 410 and the receptacle 420 together, whereby the rotational self-alignment component 417 of the plug 400 rotationally engages with the cooperating and complementary rotational self-alignment component 427 of the receptacle 420. The rotational self-alignment components 417 and 427 allow optical fibers of the plug 410 and optical fibers of the receptacle 420 to conveniently and properly align with each other through interconnection and rotation of the plug 410 and receptacle 420.

An optical fiber held or contained within the male plug 410 and an optical fiber held or contained within the female receptacle 420 allow transfer of light when they are rotationally self-aligned to optically communicate with each other. The male plug 210 and the female receptacle 420 allow the transfer of torque from a motor to an instrument, and are configured to allow for quick connect/disconnect to maintain engagement of connections.

Upon connection, the ferrule bodies are configured to self-rotate into a rotational self-alignment that allows for contact of the optical faces and engagement of the torque transfer. The optical contacts can be rotationally engaged and rotate together simultaneously with respect to one another while the motor is in action. The optical ferrules can be connected passively in an axial direction and can be connected and disconnected by the action of push/pull. Bearings can be incorporated to reduce friction during rotation.

FIGS. 20-24 illustrate various views of an exemplary optical connector 500 with a ferrule guide that can be configured as a rotational self-alignment connector according to the present embodiment.

The optical connector 500 can be configured to include rotational self-alignment structures as described above that provide rotational self-alignment engagement of the optical connector 500 and can be selected from tooth configurations, helical thread configurations, ferrule guide configurations, spring sleeve configurations, and other derivatives thereof and combinations therefor, to facilitate interconnection of one connector with a cooperating rotational self-alignment structure of another connector. The ferrule guide can be at the entrance of a passage to guide the ferrule during insertion.

The rotational self-alignment structures provide rotational engagement and allow the optical ferrules to self-rotate into rotational self-alignment upon the action of connecting according to one or more aspects of the present disclosure.

Figure 20:
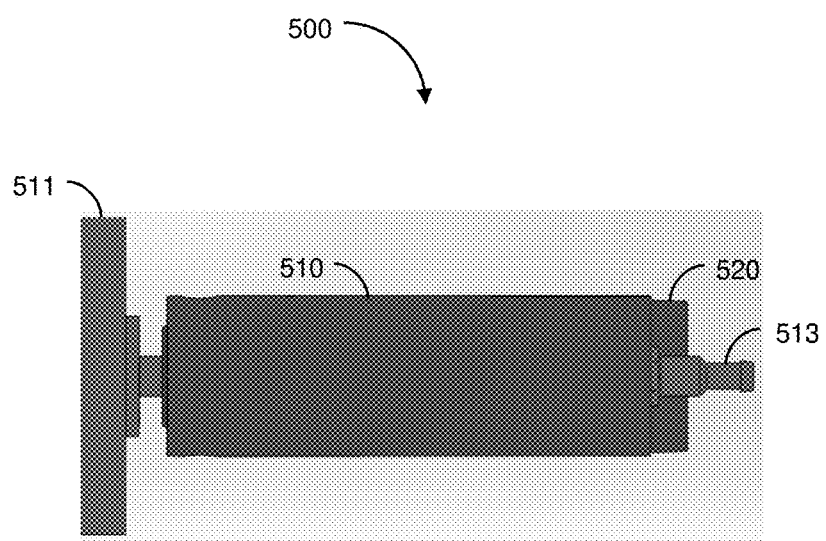
FIG. 20 is a side view of an optical connector can be configured as a rotational self-alignment connector according to an embodiment.
Figure 21:
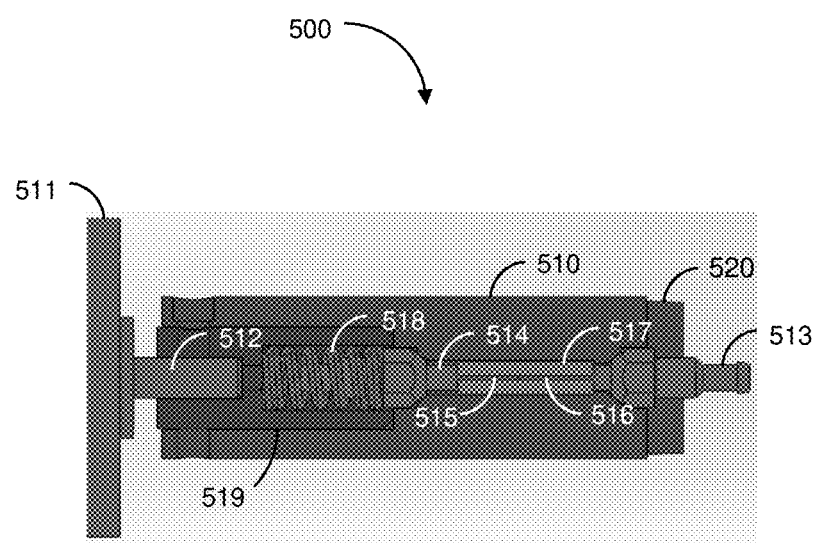
FIG. 21 is a cross-sectional side view of an optical connector that can be configured as a rotational self-alignment connector according to an embodiment.

FIG. 20 is a side perspective view and FIG. 21 is a cross-sectional view of the optical connector 500 that has a housing 510 extending between two ends. A flange 511 is connected at one end and a mechanical housing connection ferrule 513 is connected at the other end of the housing 510. A multi-piece rod or segmented shaft 514 is connected to the flange 511 and extends through the housing 510 between the flange 511 and the connection ferrule 513. The housing 510 axially aligns and interconnects two internally opposed optical ferrules 515, 516 that are cooperatively held together with an axial-alignment structure or component 517 that is configured as a friction sleeve. The friction sleeve 517 aligns the ferrules 515, 516 axially to allow light transfer between optical fibers with low light loss. The ferrules 515, 516 are configured to hold or pass through one or more optical fibers or similar waveguides. The ferrules 515, 516 are provided at ends of optical fiber and hold and position the fibers. The ferrules 515, 516 can be configured as a tubular member with two ends and an internal passageway that extends lengthwise between the two ends. The fibers can pass through the ferrules 515, 516 and end substantially flush with or extend beyond the end of the ferrules 515, 516.

A spring 518 is contained in an internal sheath 519 of the housing 510 near the flange 511, as illustrated in FIG. 20. The flange 511 has an extension 512 that is interconnected with the shaft 514 within the internal sheath 519, and the spring 518 provides bias to the ferrule 515 in the friction sleeve 517. The spring 518 and internal sheath configuration can be provided to either one or both of the ferrules 515, 516 to allow for constant contact of the optical faces during connection. For example, the housing 510 can be configured with another similar spring and internal sheath configuration to provide bias to the ferrule 516 in the friction sleeve 517. The spring 518 ensures constant contact is maintained between opposing optical ferrules.

The spring 518 is an elastic member that is disposed in a compressible state between a spring reception part in the housing 110 and a rear of the ferrule 515. The ferrule 515 is biased forward by an elastic force of the compressed spring 518. The parts of the connection are held in a connected state within the housing 110. The connector 500 is configured to rotate about an operating rotation shaft that is provided through the ends of the housing.

The friction sleeve axial-alignment component 517 is configured to facilitate the axial-alignment of optical fibers of the ferrule 515 with optical fibers of the opposing ferrule 516. The friction sleeve axial-alignment component 517 has a compression fit on and axially aligns and interconnects the two internally opposed ferrules 515, 516 to allow the transfer of torque from a motor connected to the flange 511 to the ferrule 513. The ferrules 515, 516 are axially aligned and connected together within the friction sleeve 516 and drive torque is generated using the friction from the friction sleeve 516 and the axial forces of the spring 518 and the housing 510 and the mechanical connector. Ribs or additional features (not shown) can be added to the flange 511 to reduce wear.

The connector 500 can be used to interconnect different configurational arrangements including, for example, an SEE scope, a motor, medical devices, or the like. The motor can drive optical fibers in the connector 100.

Figure 22:
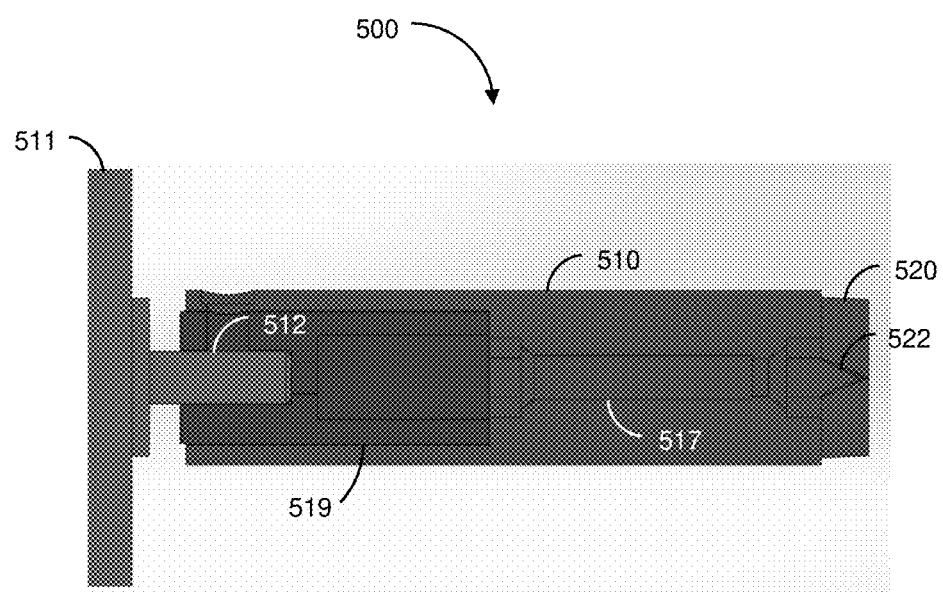
FIG. 22 illustrates a mechanical housing connection ferrule configured as a bayonet can be implemented in a rotational self-alignment connector according to an embodiment.

The connector 500 of FIG. 22 is similar to FIG. 20 and the mechanical housing connection ferrule 522 is configured as a bayonet type and can be configured as a variety of other configurations including, for example, push/pull quick connect, screw-on, snap-in, or the like.

Figure 23:
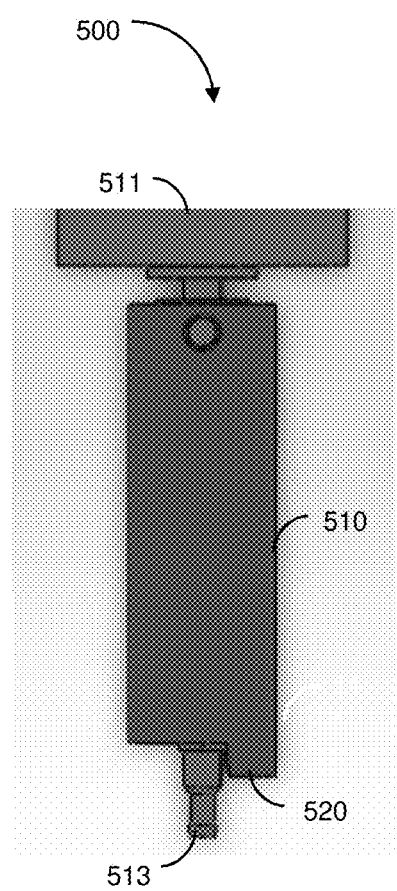
FIG. 23 illustrates an alignment structure configuration that can be configured as a rotational self-alignment connector according to an embodiment.

In FIG. 23, and end of the housing 510 near the ferrule 513 is shaped to allow interconnection of the optical connector 500 with a cooperative structure on another connector. In this case, the housing 510 is configured with an alignment structure or component in the form of an extended notch 520 to facilitate interconnection with another connector. The extended notch 520 can operate as a rotational self-alignment structure to engage with a cooperating alignment component of another connector. The notch 520 of the housing 510 is configured to interconnect with another complementary optical connector by rotating the two connectors together, whereby the notch rotational self-alignment component 520 of the connector 100 engages with the cooperating and complementary rotational self-alignment component of the other connector. The notch rotational self-alignment component 520 allows optical fibers of different optical connectors to conveniently and properly align with each other through interconnection and rotation of one connector with the other connector.

An optical fiber held or contained within the connector 500 and an optical contact is provided between the ferrule 515 and the opposing ferrule 516 to allow transfer of light. The mechanical contact of the flange 511 and the housing 100 allows the transfer of torque from a motor to an instrument, such as an SEE scope, a medical device, or the like. The connector 500 is configured to allow for quick connect/disconnect to maintain engagement of connections.

Upon connection, the ferrule bodies 514, 515 are configured to self-rotate into a rotational self-alignment that allows for contact of the optical faces and engagement of the torque transfer. The optical contacts can be rotationally engaged and can rotate together simultaneously with respect to one another while the motor is in action. The optical ferrules 514, 515 can be connected passively in an axial direction and can be connected and disconnected by the action of push/pull. Bearings can be incorporated to reduce friction during rotation.

Figure 24:
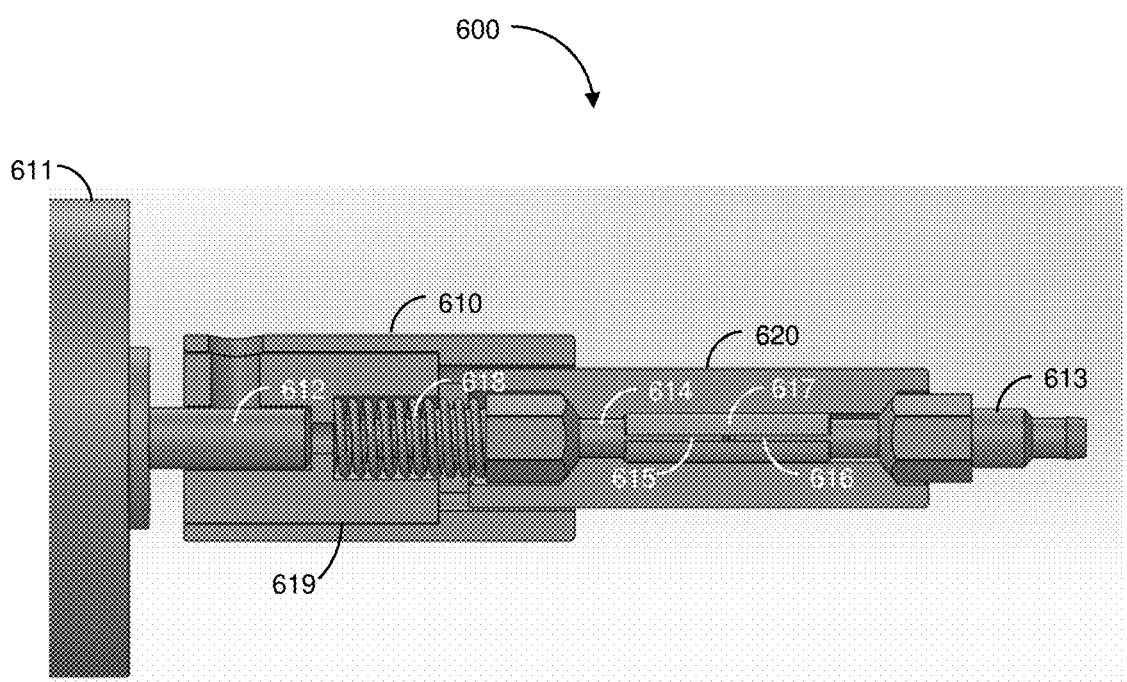
FIG. 24 is a cross-sectional side view of an optical connector can be configured as a rotational self-alignment connector according to an embodiment.
Figure 25:
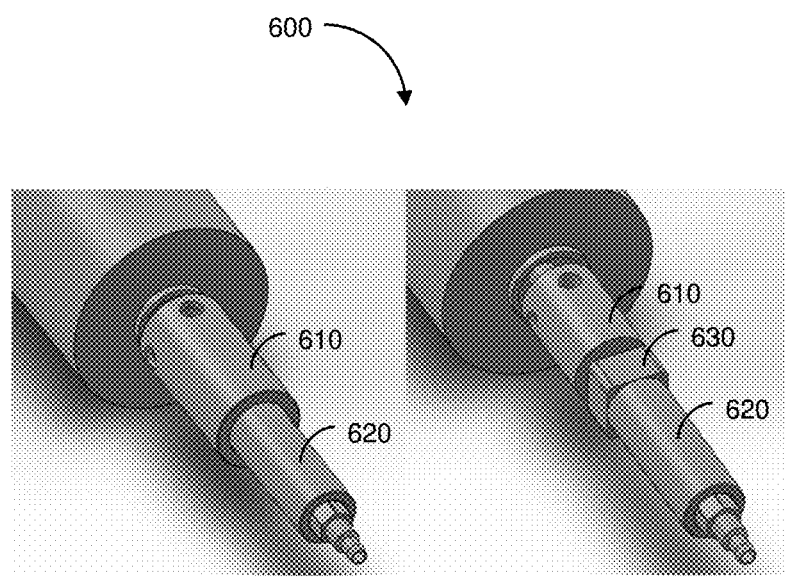
FIG. 25 is a top perspective view of an optical connector that can be configured as a rotational self-alignment connector according to an embodiment.

FIGS. 24 and 25 illustrate various views of an exemplary optical connector 600 with a spring sleeve that can be configured as a rotational self-alignment connector according to the present embodiment.

The optical connector 600 can be configured to include rotational self-alignment structures as described above that provide rotational self-alignment engagement of the optical connector 600 and can be selected from tooth configurations, helical thread configurations, ferrule guide configurations, spring sleeve configurations, and other derivatives thereof and combinations therefor, to facilitate interconnection of one connector with a cooperating rotating self-alignment structure of another connector. The ferrule guide can be at the entrance of a passage to guide the ferrule during insertion.

The rotational self-alignment structures provide rotational self-alignment engagement and allow the optical ferrules to self-rotate into rotational self-alignment upon the action of connecting according to one or more aspects of the present disclosure.

FIG. 24 is a cross-sectional side view of the optical connector 600 that has two elongated cylindrical sections 610 and 620 interconnected together. The section 610 is configured as an elongated cylindrical section with a protruding ferrule 615. The female receptacle 620 is configured as an elongated housing with a recessed ferrule 616 within the receptacle 620 and a mechanical housing connection ferrule 613 at the other end.

A flange 611 is connected to the section 610 and a mechanical housing connection ferrule 613 is connected to the section 620. A multi-piece rod or segmented shaft 614 is connected to the flange 611 and extends through the sections 610 and 620 between the flange 611 and the ferrule 613. The sections 610 and 620 axially align and interconnect two internally opposed optical ferrules 615, 616 that are cooperatively held together with an axial-alignment structure or component 317 that is configured as a friction sleeve. The friction sleeve 617 can align the ferrules 615, 616 axially to allow light transfer between fibers with low light loss. The ferrules 615, 616 are configured to hold or pass through one or more optical fibers or similar waveguides.

A spring 618 is contained in an internal sheath 619 of the section 610 near the flange 611. The flange 611 has an extension 612 that is interconnected with the shaft 614 within the internal sheath 619, and the spring 618 provides bias to the ferrule 615 in the friction sleeve 617. Each ferrule 615, 616 can have a spring to allow for constant contact of the optical faces during connection, and the section 320 can be configured with another similar spring and internal housing configuration to provide bias to the ferrule 616 in the friction sleeve 617.

The friction sleeve axial-alignment component 617 is configured to facilitate the axial-alignment of optical fibers of the ferrule 615 with optical fibers of the opposing ferrule 616. The friction sleeve axial-alignment component 617 has a compression fit on and axially aligns and interconnects the two internally opposed ferrules 615, 616 to allow the transfer of torque from a motor connected to the flange 611 to the ferrule 613. The ferrules 615, 616 are axially aligned and connected together within the friction sleeve 617 and drive torque is generated using the friction from the friction sleeve 617 and the axial forces of the spring 618 and the housing 610 and the mechanical connector. Ribs or additional features (not shown) can be added to the flange 311 to reduce wear.

FIG. 25 shows a top perspective view of different configurations of the connector 600, where the left configuration is the same as FIG. 24 and a different configuration on the right includes a helical threaded mechanical element 630 interconnecting the sections 610 and 620.

An optical fiber held or contained within the connector 600 and an optical contact is provided between the ferrule 615 and the opposing ferrule 616 to allow transfer of light. The mechanical contact of the flange 611 and the section 610 allows the transfer of torque from a motor to an instrument, such as a medical device. The connector 600 is configured to allow for quick connect/disconnect to maintain engagement of connections.

Upon connection, the ferrule bodies 615, 616 are configured to self-rotate into a rotational self-alignment that allows for contact of the optical faces and engagement of the torque transfer. The optical contacts can be engaged rotationally and can rotate together simultaneously with respect to one another while the motor is in action. The optical ferrules 615, 616 can be connected passively in an axial direction and can be connected and disconnected by the action of push/pull. Bearings can be incorporated to reduce friction during rotation.

FIGS. 26-29 illustrate various views of an exemplary push/pull quick disconnect optical connector 700 according to one or more embodiments.

The optical connector 700 can be configured to include rotational self-alignment structures as described above that provide rotational self-alignment engagement of the optical connector 700 and can be selected from tooth configurations, helical thread configurations, ferrule guide configurations, spring sleeve configurations, and other derivatives thereof and combinations therefor, to facilitate interconnection of one connector with a cooperating rotational self-alignment structure of another connector. The ferrule guide can be at the entrance of a passage to guide the ferrule during insertion.

The rotational self-alignment structures provide rotational engagement and allow the optical ferrules to self-rotate into rotational self-alignment upon the action of connecting according to one or more aspects of the present disclosure.

Figure 26:
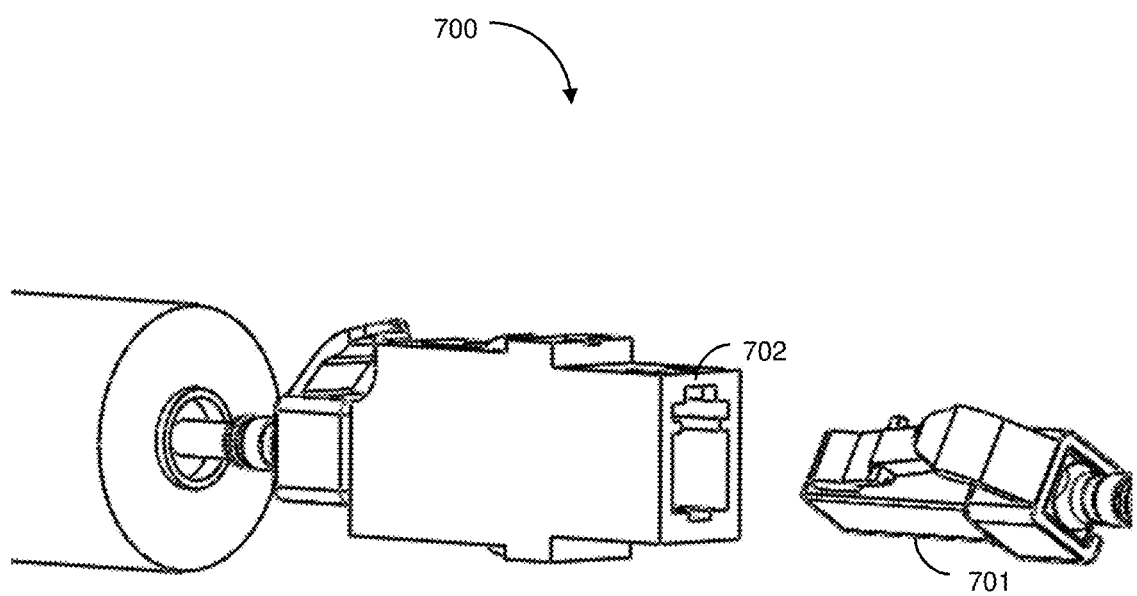
FIG. 26 is a side perspective view of an exemplary push/pull quick disconnect optical connector that can be configured as a rotational self-alignment connector according to one or more embodiments.
Figure 27:
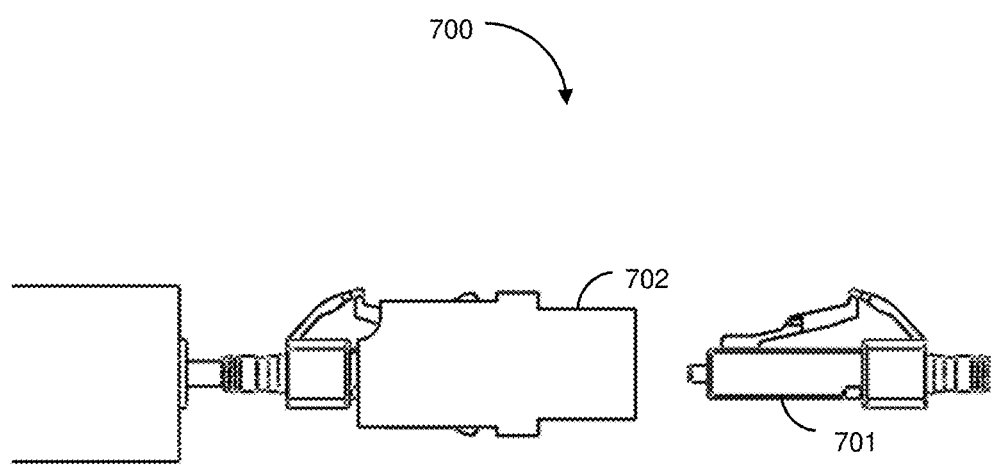
FIG. 27 is a side view of an exemplary push/pull quick disconnect optical connector that can be configured as a rotational self-alignment connector as according to one or more embodiments.
Figure 28:
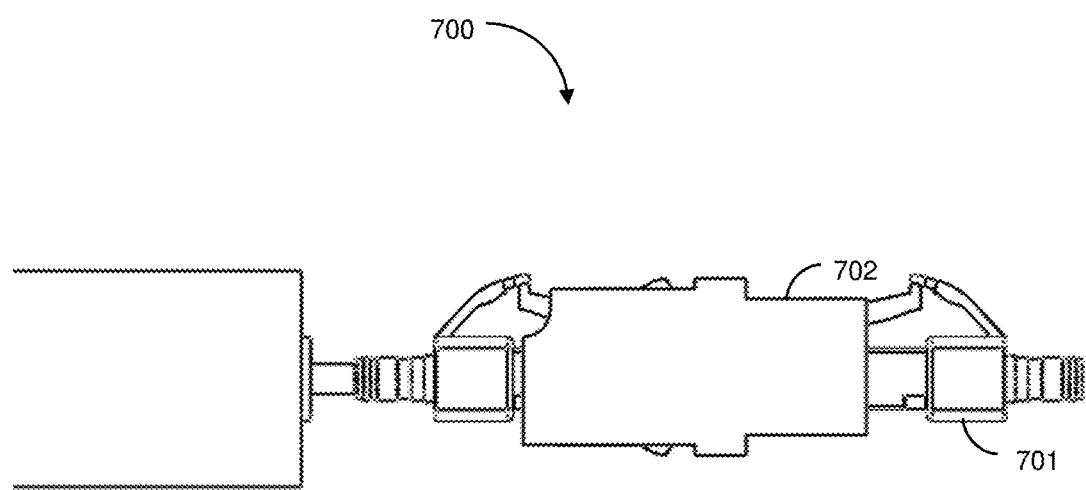
FIG. 28 is a side view of an exemplary push/pull quick disconnect optical connector that can be configured as a rotational self-alignment connector according to one or more embodiments.
Figure 29:
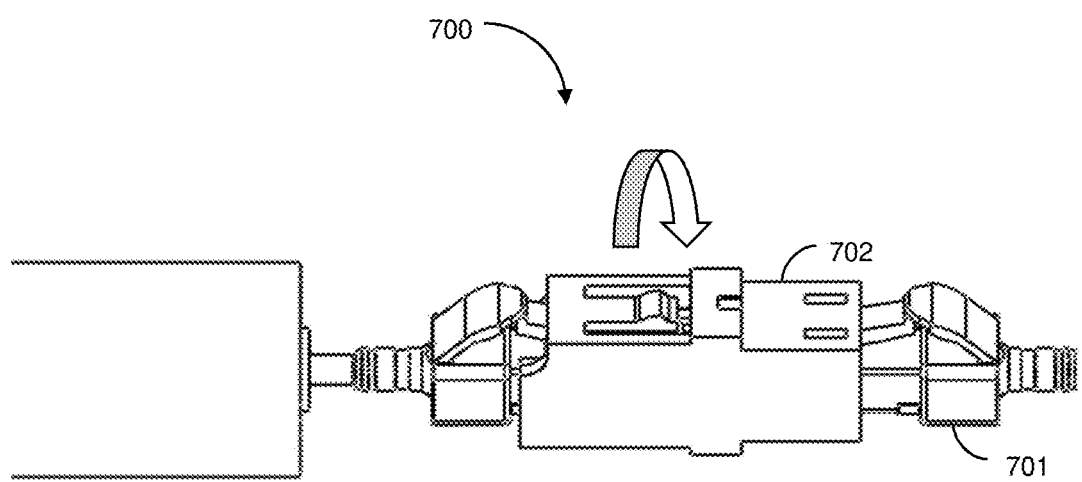
FIG. 29 is a side view of an exemplary push/pull quick disconnect optical connector that can be configured as a rotational self-alignment connector according to one or more embodiments.

FIGS. 26 and 27 show the optical connector 700 where a male plug 701 is axially aligned and separated from a female receptacle 702. The male plug 701 and female receptacle 702 interconnect together by pushing the male plug 701 into the female receptacle 702. The female receptacle 220 has a recessed cavity within the housing of the receptacle 702. FIGS. 28 and 29 show the optical connector 700 where the male plug 701 is interconnected with the female receptacle 702. The male plug 701 has a pressing link to disconnect the male plug from the female receptacle 701.

Figure 30:
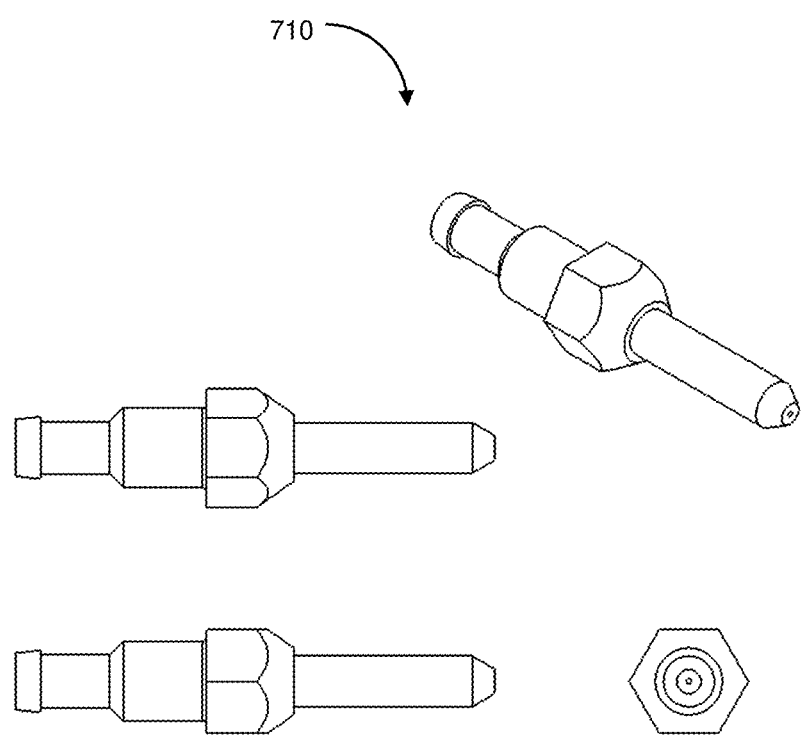
FIG. 30 illustrates various views of an optical ferrule that can be implemented in a rotational self-alignment connector according to one or more embodiments.

FIG. 30 shows various views of an optical ferrule 710 that can be implemented in rotational self-alignment connectors according to one or more embodiments.

Figure 31:
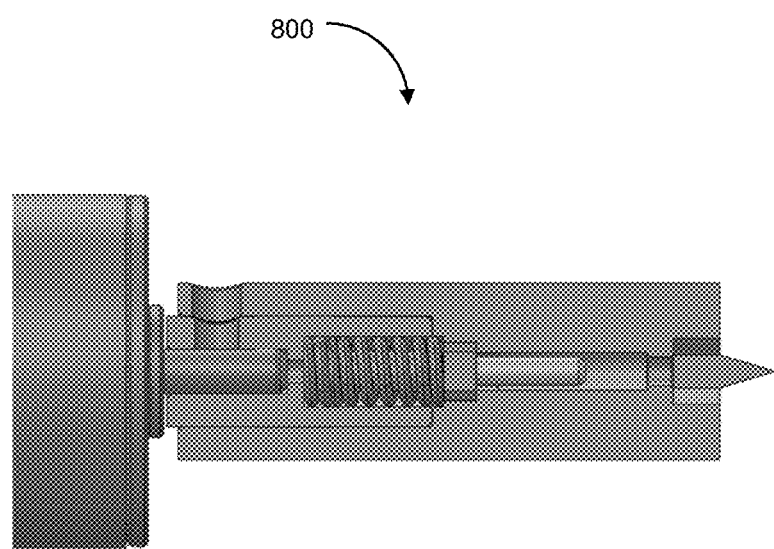
FIG. 31 is a cross-sectional side view of an optical connector that can be configured as a rotational self-alignment connector according one or more embodiments.
Figure 32:
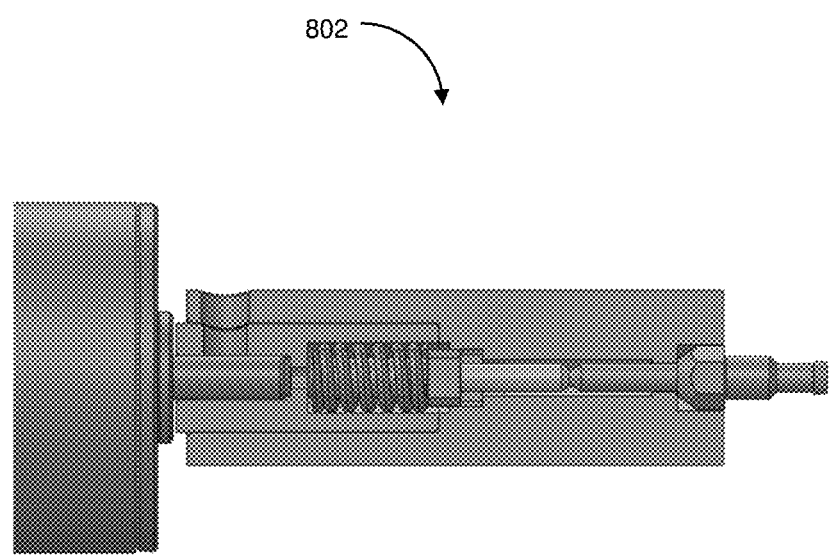
FIG. 32 is a cross-sectional side view of an optical connector that can be configured as a rotational self-alignment connector according one or more embodiments.
Figure 33:
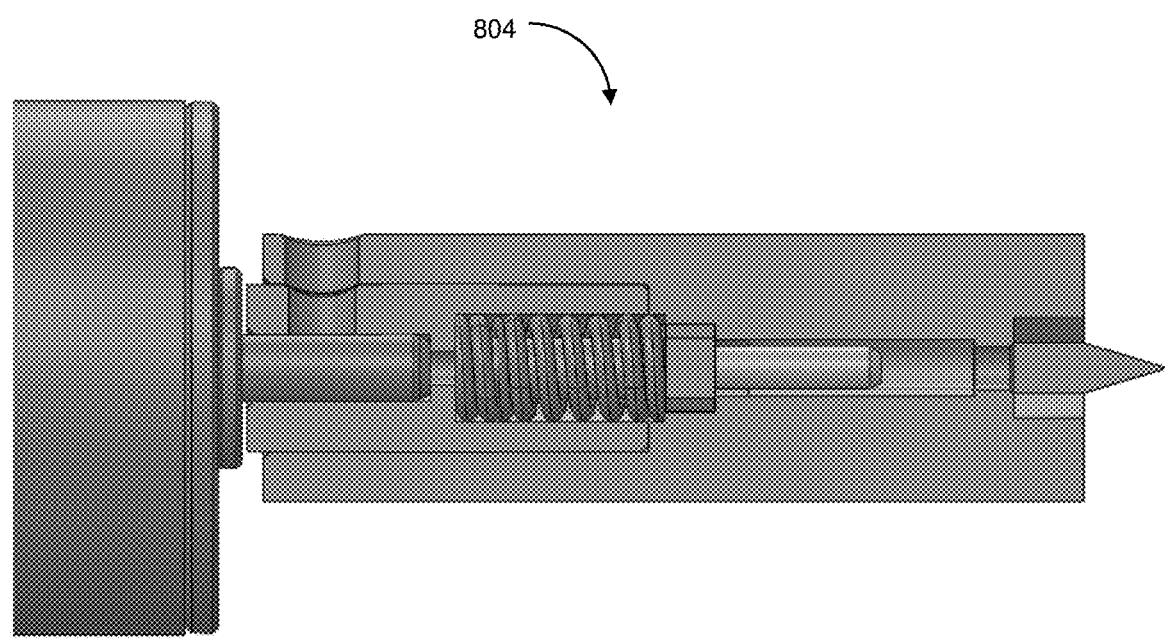
FIG. 33 is a cross-sectional side view of an optical connector that can be configured as a rotational self-alignment connector according one or more embodiments.
Figure 34:
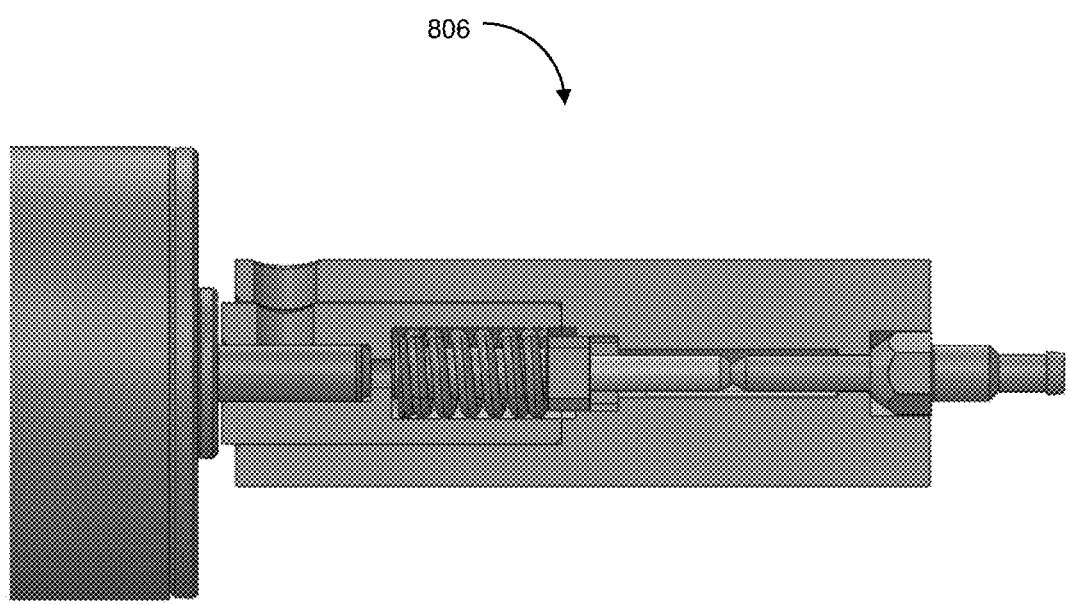
FIG. 34 is a cross-sectional side view of an optical connector that can be configured as a rotational self-alignment connector according to one or more embodiments.

The optical connectors 800, 802, 804, 806 of FIGS. 31-34 are similar to the optical connector of FIG. 20. The mechanical housing connection ferrules of FIGS. 31 and 33 are configured as a bayonet type and can be configured as a variety of other configurations including, for example, push/pull quick connect, or the like.

Figure 35:
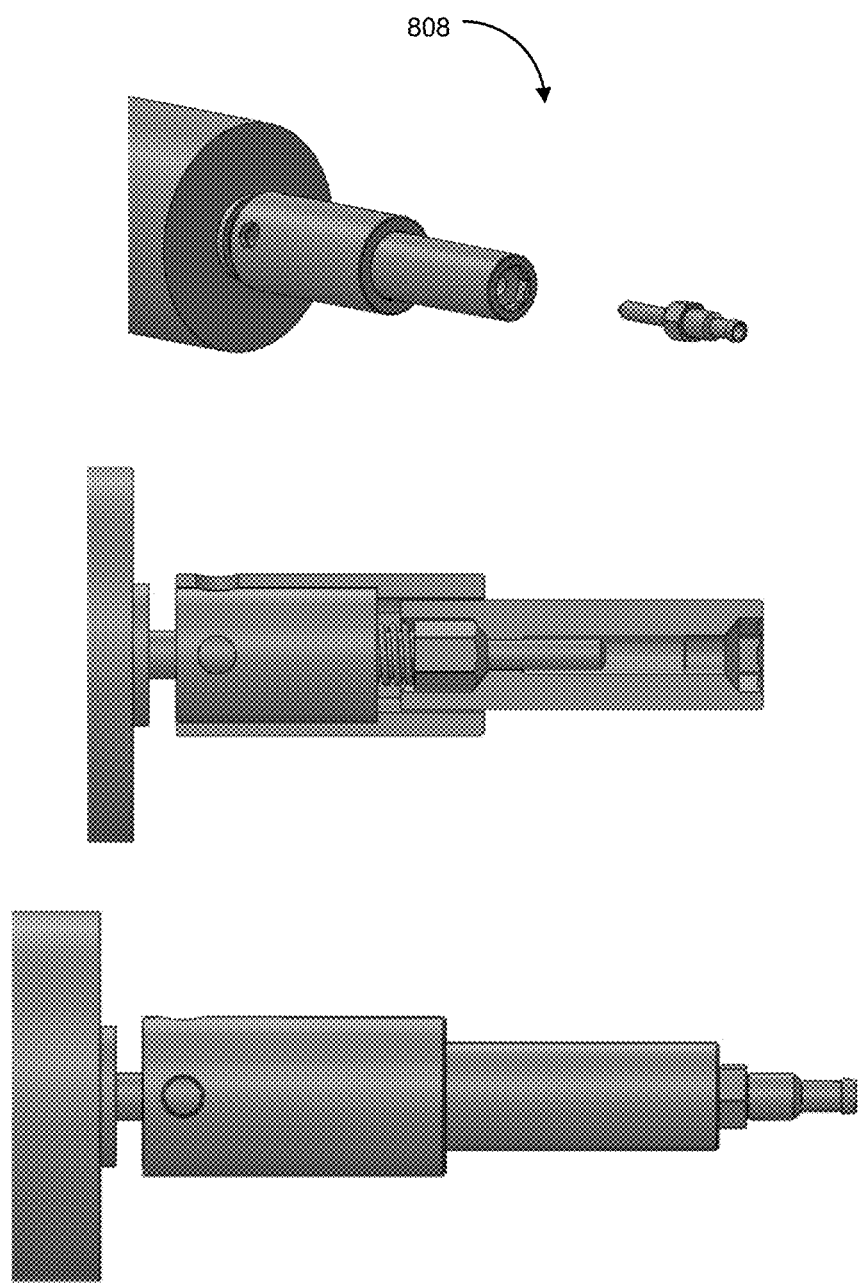
FIG. 35 illustrates a front perspective view and side views of optical connectors that can be configured as rotational self-alignment connectors according to one or more embodiments.
Figure 36:
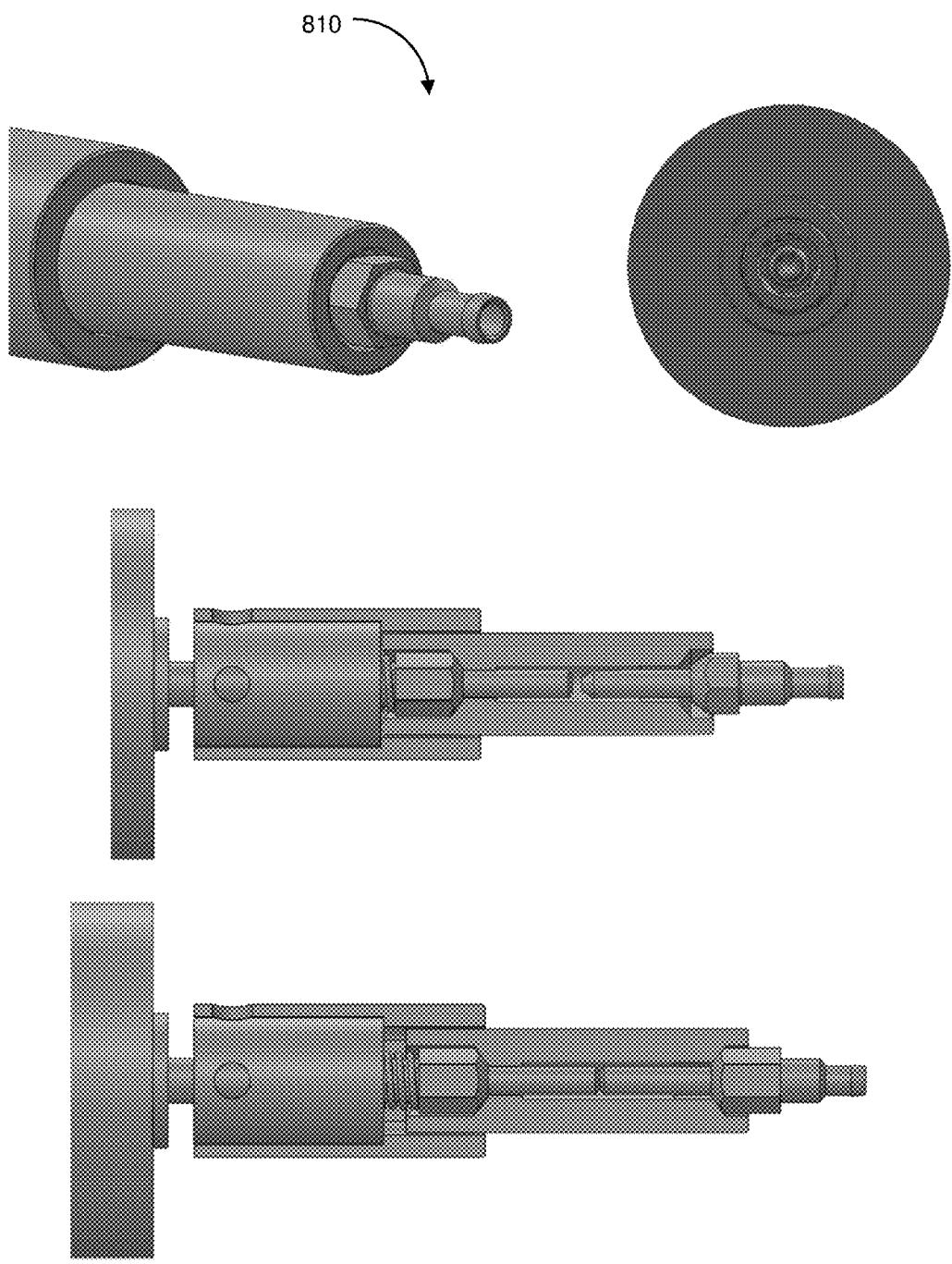
FIG. 36 illustrates a front perspective view and top and side views of optical connectors that can be configured as rotational self-alignment connectors according to one or more embodiments.

FIGS. 35 and 36 show various views of optical connectors 808 and 810 that can be configured with rotational self-alignment structures as described above according to one or more embodiments.

Figure 37:
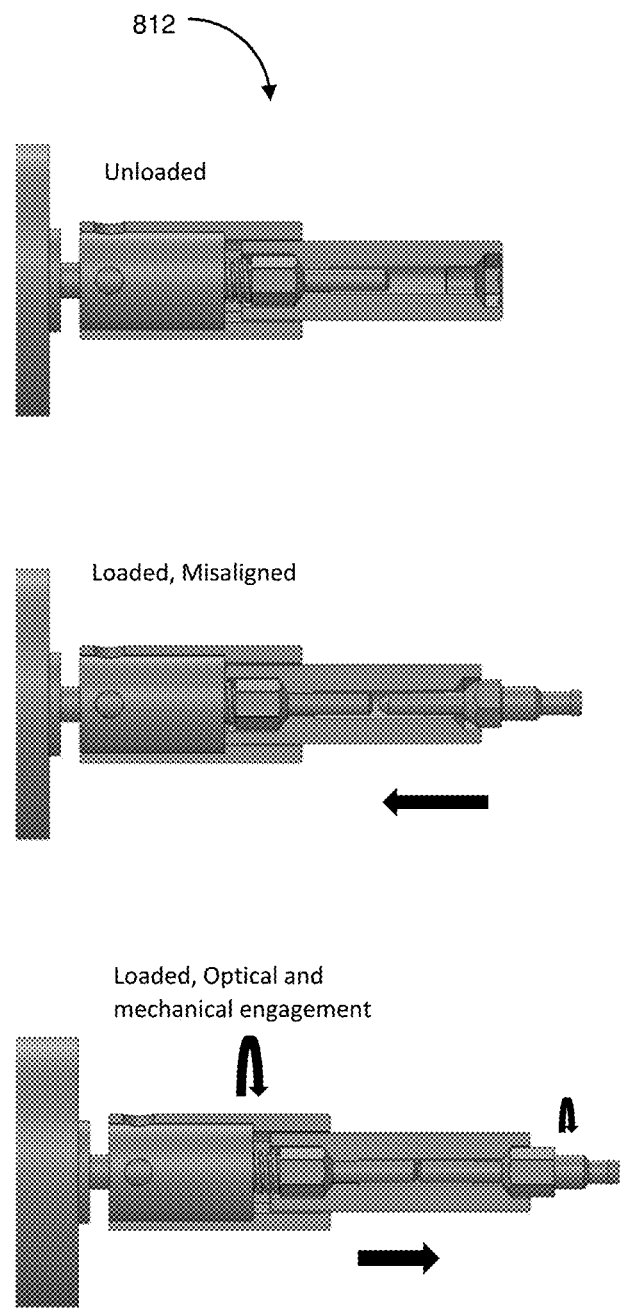
FIG. 37 are side views of optical connectors that can be configured as rotational self-alignment connectors according to one or more embodiments.

FIG. 37 are side views showing optical connectors 812 that can be configured with rotational self-alignment structures as described above in an unloaded state, a loaded and misaligned state, and a loaded state with mechanical engagement according to one or more embodiments.

As described above, the optical connection may include a plurality of ferrules, an optical contact to allow transfer of light, a mechanical contact to allow torque transfer from the optical connection, and a rotational self-alignment structure to allow optical fibers of different optical connectors to self-rotate into rotational self-alignment upon action of connecting, wherein the ferrules are aligned and engage the torque transfer.

The rotational self-alignment structure can be a tooth configuration, a helical thread configuration, a ferrule guide configuration, a spring sleeve configuration, derivatives thereof and combinations therefrom, to facilitate interconnection of one connector with a cooperating rotational self-alignment structure of another connector. The rotational self-alignment structure can be a tooth configuration including angled and pointed teeth configured to interconnect with another complementary optical connector by rotating the two connectors together. The optical connection can include a friction sleeve configuration comprising a friction sleeve that has a compression fit on and axially aligns and interconnects opposed ferrules. The optical connection can include a spring, wherein drive torque is generated using friction from the friction sleeve and the axial forces of the spring. The plurality of ferrules can include optical faces and the at least one spring allows for constant contact of the optical faces during connection.

The optical connection can have a housing that extends between two ends, and a flange connected at one end of the housing and a connection ferrule connected at the other end of the housing. The optical connection can have a multi-piece rod or segmented shaft connected to the flange and extending through the housing between the flange and the connection ferrule. The optical connection can have a spring and an internal sheath, wherein the spring is contained in the internal sheath of the housing near the flange. The housing of the optical connection can axially and rotationally self-align and interconnect two internally opposed optical ferrules that are cooperatively held together with the rotational self-alignment structure. The rotational self-alignment structure can axially and rotationally self-align the ferrules to allow light transfer between fibers with low light loss.

The optical connection can include a rotational self-alignment optical connector. The optical connection can include at least one optical fiber. The optical connection can be configured for rotational self-alignment and torque transfer. The plurality of ferrules can be optical ferrules. The plurality of ferrules can include a mechanical connection ferrule. The plurality of ferrules can be configured to self-rotate into a rotational self-alignment that allows for contact of optical faces and engagement of the torque transfer. The plurality of ferrules can include optical fibers that rotate together simultaneously with respect to one another while motorized. The plurality of ferrules can be optical ferrules that are passively connected in an axial direction. The plurality of ferrules can be optical ferrules that are connected and disconnected by push/pull action.

The optical connection rotational self-alignment arrangements described above include tooth configurations, helical thread configurations, ferrule guide configurations, spring sleeve configurations, derivatives thereof, and combinations therefrom, and other optical connection configurations that allow the optical ferrules to self-rotate into rotational self-alignment upon the action of connecting according to one or more aspects of the present disclosure.

The optical connection configurations described above can be configured to conform to a variety of connector types including LC, SC, FC, ST, LX-5, MU, and MPO. SC and LC are the most common connector configurations.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An optical connection comprising:
   an optical contact to allow transfer of light;
   a mechanical contact to allow torque transfer from the optical connection; and
   a rotational self-alignment structure to allow optical fibers of different optical connectors to self-rotate into rotational self-alignment upon action of connecting, the rotational self-alignment structure comprising:
   a first connector having an exposed ferrule body with an optical face; and
   a second connector having a ferrule body with an optical face embedded within a rotational self-alignment sleeve,
   wherein, upon connection, the ferrule bodies of the first connector and the second connector are each configured to self-rotate into a rotational self-alignment that allows optical contact of the optical faces and engagement of the torque transfer,
   wherein, the optical faces rotate together simultaneously with respect to one another while torque transfer is in action.

2. The optical connection according to claim 1, wherein the rotational self-alignment structure is selected from the group comprising a tooth configuration, a helical thread configuration, a ferrule guide configuration, a spring sleeve configuration, derivatives thereof and combinations therefrom, to facilitate interconnection of the first connector with a cooperating rotational self-alignment structure of the second connector.

3. The optical connection according to claim 2, wherein the rotational self-alignment structure is a tooth configuration comprising a plurality of angled and pointed teeth configured to interconnect with a plurality of angled and pointed teeth on another complementary optical connector by rotating the first and second connectors together.

4. The optical connection according to claim 2, further comprising a friction sleeve configuration comprising a friction sleeve that has a compression fit on and axially aligns and interconnects opposed ferrules.

5. The optical connection according to claim 4, further comprising a spring,
wherein drive torque is generated using friction from the friction sleeve and the axial forces of the spring,
wherein the spring allows for constant contact of the optical faces during connection.

6. The optical connection according to claim 1, further comprising at least one optical fiber.

7. The optical connection according to claim 1, further comprising a housing that extends between two ends, and a flange connected at one end of the housing and a connection ferrule connected at the other end of the housing.

8. The optical connection according to claim 7, further comprising a multi-piece rod or segmented shaft connected to the flange and extending through the housing between the flange and the connection ferrule.

9. The optical connection according to claim 8, further comprising a spring and an internal sheath, wherein the spring is contained in the internal sheath of the housing near the flange.

10. The optical connection according to claim 7, wherein the housing axially and rotationally self-aligns and interconnects a plurality of ferrules that are cooperatively held together with the rotational self-alignment structure.

11. The optical connection according to claim 10, wherein the rotational self-alignment structure aligns the plurality of ferrules axially to allow light transfer between fibers with low light loss.

12. The optical connection according to claim 10, wherein the plurality of ferrules are optical ferrules.

13. The optical connection according to claim 10, wherein the plurality of ferrules comprises a mechanical connection ferrule.

14. The optical connection according to claim 10, wherein the plurality of ferrules is configured to self-rotate into a rotational self-alignment that allows for contact of optical faces and engagement of the torque transfer.

15. The optical connection according to claim 10, wherein the plurality of ferrules comprises optical fibers that rotate together simultaneously with respect to one another while motorized.

16. The optical connection according to claim 10, wherein the plurality of ferrules are optical ferrules that are passively connected in an axial direction.

17. The optical connection according to claim 10, wherein the plurality of ferrules are optical ferrules that are connected and disconnected by push/pull action.

* * * * *